United States Patent [19]
McGill et al.

[11] Patent Number: 5,704,385
[45] Date of Patent: Jan. 6, 1998

[54] AUTOMATIC AND MANUALLY OPERABLE SAFETY SHUTOFF VALVE

[75] Inventors: James C. McGill, Glendale, Calif.; Antonio F. Fernandez, Quezon City, Philippines

[73] Assignee: Seismic Safety Products, Inc., Wenatchee, Wash.

[21] Appl. No.: 403,098

[22] Filed: Mar. 13, 1995

Related U.S. Application Data

[63] Continuation-in-part of Ser. No. 149,569, Nov. 9, 1993, Pat. No. 5,409,031, which is a continuation-in-part of Ser. No. 82,605, Jun. 23, 1993, abandoned, which is a continuation-in-part of Ser. No. 782,314, Oct. 24, 1991, abandoned.

[51] Int. Cl.$^6$ .................................................. F16K 17/36
[52] U.S. Cl. .......................... 137/39; 137/368; 137/460; 251/65; 251/294
[58] Field of Search ........................ 137/38, 39, 368, 137/460; 251/65, 294

[56] References Cited

U.S. PATENT DOCUMENTS

| | | | |
|---|---|---|---|
| 1,495,858 | 5/1924 | McGinnis | 137/368 X |
| 2,215,044 | 2/1940 | Kammerdiner | 137/38 |
| 2,585,316 | 2/1952 | Hobson | 137/38 |
| 2,927,592 | 3/1960 | Ferre | 137/38 |
| 3,747,616 | 7/1973 | Lloyd . | |
| 4,212,313 | 7/1980 | Winters | 137/38 |
| 4,245,814 | 1/1981 | Shimizu . | |
| 4,382,449 | 5/1983 | Nelson | 137/38 |
| 4,475,565 | 10/1984 | Keller et al. | 137/39 |
| 4,485,832 | 12/1984 | Plemmons et al. | 137/38 |
| 4,844,113 | 7/1989 | Jones . | |
| 4,872,365 | 10/1989 | Wolf | 251/294 X |
| 4,903,720 | 2/1990 | McGill | 137/38 |
| 5,052,429 | 10/1991 | Yoo | 137/38 |
| 5,119,841 | 6/1992 | McGill . | |

FOREIGN PATENT DOCUMENTS

| 57-12172 | 1/1982 | Japan | 137/38 |
|---|---|---|---|

*Primary Examiner*—Stephen M. Hepperle

[57] ABSTRACT

A seismic safety apparatus has a housing having an internal space and an external surface. A seismic safety activating mechanism is provided inside the housing for activating a seismic safety device. The seismic safety activating mechanism includes an inertia ball recess located in the internal space, an inertia ball in the housing that has an unactuated position on the recess and an actuated position displaced from the unactuated position on the recess. The inertia ball recess is formed so that when the inertia ball is in the valve member recess, vibrations or seismic shocks of a predetermined magnitude cause the inertia ball to move from the unactuated position to the actuated position. An engagement component inside the housing is provided as part of the seismic safety activating mechanism at the actuated position for engagement with the inertia ball when the inertia ball is displaced from the unactuated position. A permanent magnet is provided exterior of the housing for manually moving the inertia ball from the unactuated position to the actuated position to engage the engagement component.

6 Claims, 22 Drawing Sheets

1

AUTOMATIC AND MANUALLY OPERABLE SAFETY SHUTOFF VALVE

This is a Continuation-In-Part of U.S. patent application Ser. No. 08/149,569, filed Nov. 9, 1993, now U.S. Pat. No. 5,409,031 which is a Continuation-In-Part of U.S. patent application Ser. No. 08/082,605, filed Jun. 23, 1993 abandoned which is a Continuation of U.S. patent application Ser. No. 07/782,314, filed Oct. 24, 1991, now abandoned.

BACKGROUND OF THE INVENTION

1. Field of the Invention

The present invention relates to a safety apparatus for automatically interrupting the flow of a fluid, in particular a gas or fuel line, upon the occurrence of a vibration or shock, such as a seismic disturbance or earthquake. In addition, it is a device that can be turned off manually with little effort and whenever desired without the use of special tools and a device which eliminates seals to the outside environment, thereby eliminating the possibility of leakage.

2. Description of the Prior Art

Various devices are known in the art for shutting off fuel systems in the event of a seismic disturbance or the like. For example, U.S. Pat. No. 4,331,171 to Novi requires a first ball to close the fuel line and at least a second ball, wherein a second ball is mounted within the casting in such a manner that a tremor would cause the second ball to dislodge the first ball from its pedestal. The patent also requires the ball to close the fuel line to be mounted in a concave cup which is supported by a plurality of ball bearings and includes a concave member, as well as a resilient means (a spring or the like) for biasing the cup against the concave member.

U.S. Pat. No. 4,565,208 to Ritchie requires the inclusion of a track and at least a ball riding in the track, and in addition requires the inclusion of "an obstruction" which causes the ball to leave the track when a seismic disturbance causes a ball to contact the obstruction with sufficient energy, and further requires the obstruction to include an inclined surface which extends over the track and has a height which decreases across the width of the track.

U.S. Pat. No. 4,475,565 to Keller et al. discloses a magnetically actuable shock responsive unit. This unit includes a valve mechanism for shutting off the flow in a fluid line and is operable upon shock induced horizontal displacement of a weight relative to a support to actuate the valve. An electromagnet is provided for providing a separate actuation of the weight. Movement of the weight from its support to the side of the housing causes the weight to engage a movable tube that releases a mechanism that closes the valve. However, there is no simple means of manually shutting off the valve of Keller et al.

U.S. Pat. No. 4,903,720 to McGill, one of the inventors of the present invention, discloses a safety shutoff device usable in any position. An inertia ball engages a first member so as to move the first member from a first position to a second position in response to vibrations or shocks imparted to the housing. However, this device provides no simple manual shutoff feature.

U.S. Pat. No. 5,119,841 discloses another safety shutoff apparatus in which an inertia ball normally rests on an indented surface, and a lever is pivotably mounted, with a permanent magnet mounted beneath the free end of the lever. When a shock or vibration causes the inertia ball to jump onto the lever and roll toward its free end, the inertia ball is attracted to the permanent magnet so as to cause the lever to be pivoted downwardly. However, similar to the above mechanisms, there is no manual shutoff feature provided for this device.

SUMMARY OF THE INVENTION

The purpose of the present invention is to provide and improve a safety device which is especially designed to eliminate the need for an external seal when the fuel flow is turned off or on by manual or automatic operation or the like, and which provides an easy manual means of turning off the flow of fuel whenever desired. To achieve this result, a magnet or the like is actuated in an external manner to open and close the flow of fuel.

A more specific purpose of the present invention is to provide an easy way of manually shutting off a seismic safety valve. As noted above, the prior art provides few, if any, manual shutoff mechanisms for seismic safety devices. Standard manual shutoffs that may be provided by a gas company may not only become stuck to the point that they could not be turned off with reasonable effort, but may even require the use of tools and a degree of physical strength. Thus it is a further object of the present invention to provide an easy to use manual shutoff safety device which provides the customer with an easy way of shutting off the gas supply without the use of tools when the need for shutting off the gas occurs, such as when a gas leak is found.

In one embodiment of the invention, an on/off member comprises a safety apparatus for automatically shutting off the flow through a housing as a result of inertia induced movement of one or more elements by selected vibrations of given frequencies and acceleration. The device includes an enclosed housing, an inertia ball or the like resting in a biased recess, a recessed indentation of a predetermined configuration which is part of a first member that can pivot when a second member moves out of the said recess beyond the pivot point on to a lever mounted on the first member, causing the first member to rotate and move the second member into the field of the magnet and force the first member to effect a seal to stop the flow. An external magnet is moved about a given path to cause the second member to force the first member to its original position; when the magnetic force is removed, the second member is reseated to its resting position. Likewise the external magnet can be moved about the given path to manually shutoff the flow in the reverse order described above.

A modified embodiment of the invention includes a housing, an inertia ball or the like resting in a biased recess, and a recessed indentation of a predetermined configuration as part of a first member that can pivot when a second member moves out of the recess beyond the pivot point. The first member rotates and moves the second member into the field of the magnet and forces the first member to effect a seal to stop the flow. An external magnet or the like is moved about a given path to cause the second member to force the first member to its original position. When the magnetic force is removed, the second member is reseated to its resting position. Likewise the external magnet can be moved about the given path in the reverse order to manually shutoff the flow.

In a second embodiment of the invention, the on/off member comprises a safety apparatus for automatically shutting off the flow through a housing as a result of inertia induced movement of one or more elements by certain vibrations of given frequencies and acceleration. The device includes a housing, an inertia ball or the like resting in a biased recess, and a recessed indentation of a predetermined configuration. The inertia ball is moved out of the indentation to a second position on to a sealing surface, thereby stopping the flow. The external magnet is moved to exert a magnetic force on the inertia ball and thereby removes the inertia ball from the sealing surface, and by following a given path reseats the inertia ball to the original position, which opens the flow. The external magnet can be moved about the given path in the reverse order to manually shut-off the flow.

According to a third embodiment of the present invention, the magnet moves on the side surface of the housing in a groove or channel provided therefor. The magnet is moved by a rotating drive member or lever. By rotation of the drive member or lever, the inertia ball can be easily and quickly manually reset, or the valve device can be easily manually tripped.

According to a preferred feature according to the present invention, the present invention provides a seismic safety apparatus with a housing having an internal space and an external surface. A seismic safety activating mechanism is provided inside the housing, this seismic safety activating mechanism being adapted to activate a seismic safety function such as the closing of a valve. The seismic safety activating mechanism includes an inertia ball recess located in the internal space of the housing, an inertia ball located inside the housing and an engagement component inside the housing for engagement with the inertia ball. The inertia ball has an unactuated position on the inertia ball recess and an actuated position in which the inertia ball is displaced inside the housing from the unactuated position on the recess. The inertia ball recess is formed so that when the inertia ball is in the valve member recess, vibrations of seismic shocks of a predetermined magnitude can cause the inertia ball to move from the unactuated position to the actuated position. The engagement component is located at the actuated position for engagement with the inertia ball when the inertia ball is displaced from the unactuated position. Furthermore, the seismic safety apparatus includes a means for manually moving the inertia ball from the unactuated position to the actuated position to engage the seismic safety component. This means preferably comprises a manually movable permanent magnet on the exterior of the housing. A groove is furthermore preferably provided on the external surface of the housing with a magnet disposed in the groove. The groove extends between a first position corresponding to the actuated position and a second position corresponding to the unactuated position. This means further preferably comprises an operator that is mounted on the external surface of the housing for moving the magnet in the groove. The operator may be a drive member that has a drive slot therein with a magnet located in the drive slot. Furthermore, the drive slot can extent substantially orthogonally to the groove. The groove is preferably annular, being circular or substantially circular to provide a simple path between the respective positions for the magnet.

The engagement component of the seismic safety activating mechanism can have diverse forms depending on the type of device to which the seismic safety apparatus is applied. For example, the engagement component may be a valve seat in the housing located between a fluid inlet in the housing and a fluid outlet, as described with respect to the above embodiments. The engagement component could also be a movable tube that surrounds the inertia ball recess, having an upper end engageable by the inertia ball. The engagement component could also be a member that is movably mounted inside the housing and has an engagement surface for engaging the inertia ball that is located opposite to the inertia ball recess. Alternatively, the engagement component could be a pivotable member that is pivotably mounted inside the housing adjacent to the inertia ball recess and having an upper surface for receiving the inertia ball.

The permanent magnet preferably has a defined path of movement outside of the housing, the path including a first position in which the magnet is positioned so that the inertia ball, when located in the inertia ball recess, is within the magnetic field of the permanent magnet, and a second position in which the permanent magnet is displaced from the first position. The second position is preferably lateral of the inertia ball recess, and there is preferably provided a third position in which the permanent magnet is located so that the inertia ball is not within the magnetic field of the permanent magnet. Thus, in moving from the first to the third position, the inertia ball will be engaged by the magnetic field of the magnet, moved, and subsequently released by the magnetic field of the magnet.

BRIEF DESCRIPTION OF THE DRAWINGS

Preferred embodiments of the present invention are described below with reference to the drawing figures, in which.

DETAILED DESCRIPTION OF THE INVENTION

Figure 1:
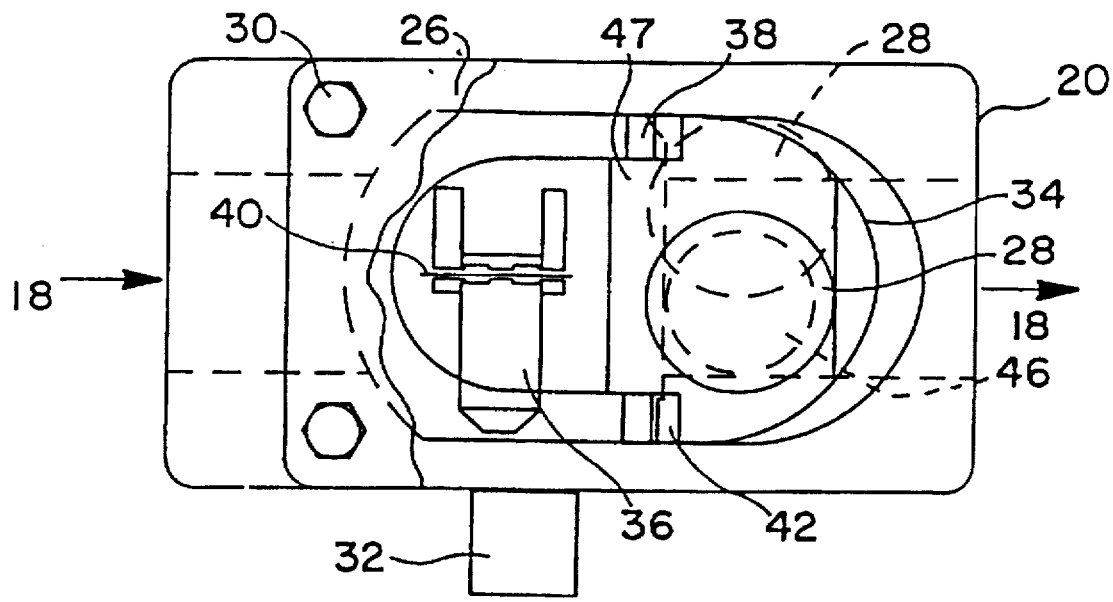
FIG. 1 is a top, partially cut away, view of a first preferred embodiment of a safety shut-off valve in an open position.
Figure 2:
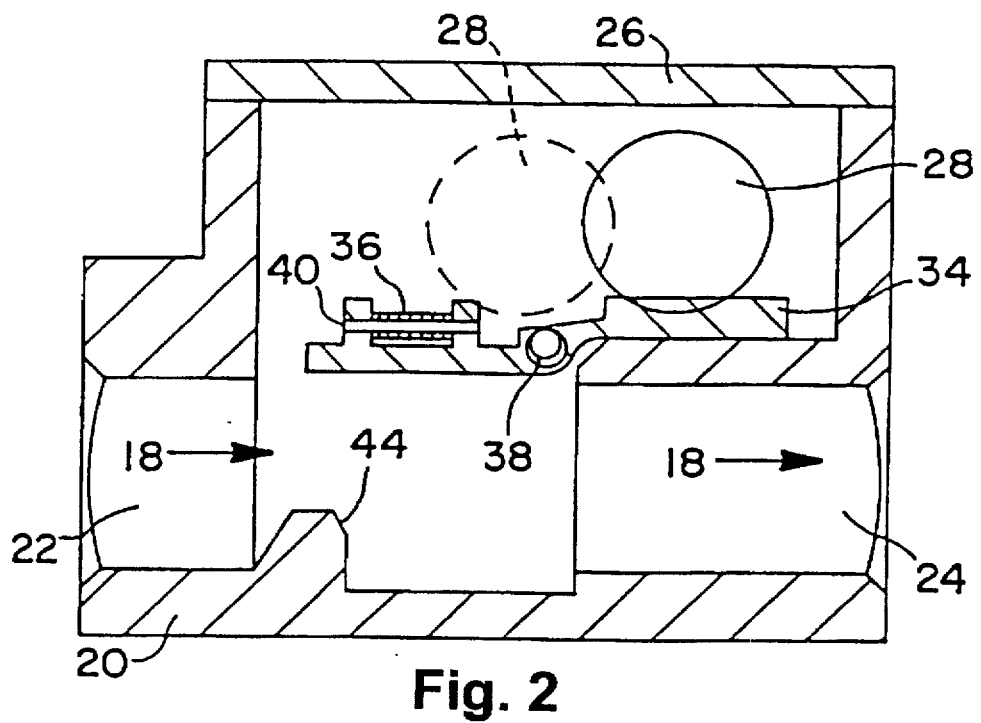
FIG. 2 is a cross-sectional front view of FIG. 1, showing the movement of an inertia ball from a resting position.

A preferred embodiment of the present invention will now be described with references to FIGS. 1–6. The safety shut-off valve consists of a closed housing 20, with a top cover 26 being fastened by bolts 30, having an inlet 22 and an outlet 24. A flapper assembly 34 has a pivot 38 affixed to the housing 20. The flapper assembly 34 consists of a hinged lever 36 attached by a hinge pin 40 to the flapper assembly 34 as shown in FIGS. 1–2. The flow of fluid through the valve is shown by flow arrows 18. An inertia ball 28 is shown in FIG. 1 in a recess 46.

The operation of the valve to shutoff the flow of fluid during seismic vibrations of a given magnitude causes the inertia ball 28 to move out of the bias recess 46 and past the pivot 38 of the flapper 34, causing the flapper 34 to rotate about the pivot 38 as shown in FIG. 2. The action of gravity on the inertia ball 28 (FIG. 3) continues the rotation of the flapper 34 until the inertia ball 28 comes to rest between a ball stop 44, lever 36, and housing wall 21 (FIG. 4) of a controlled thickness, where the lever 36 stops against a ledge or lever stop 42 and simultaneously enters into the magnetic field of an external magnet 32, located below the center of the stopped position of the inertia ball 28 (FIG. 4) and thereby applying an additional force onto the lever 36, pivot pin 40, and flapper 34, thus applying a uniform self-aligning force to a sealing surface 48 of an outlet 24, which causes a positive shut-off of the flow of gas.

Figure 3:
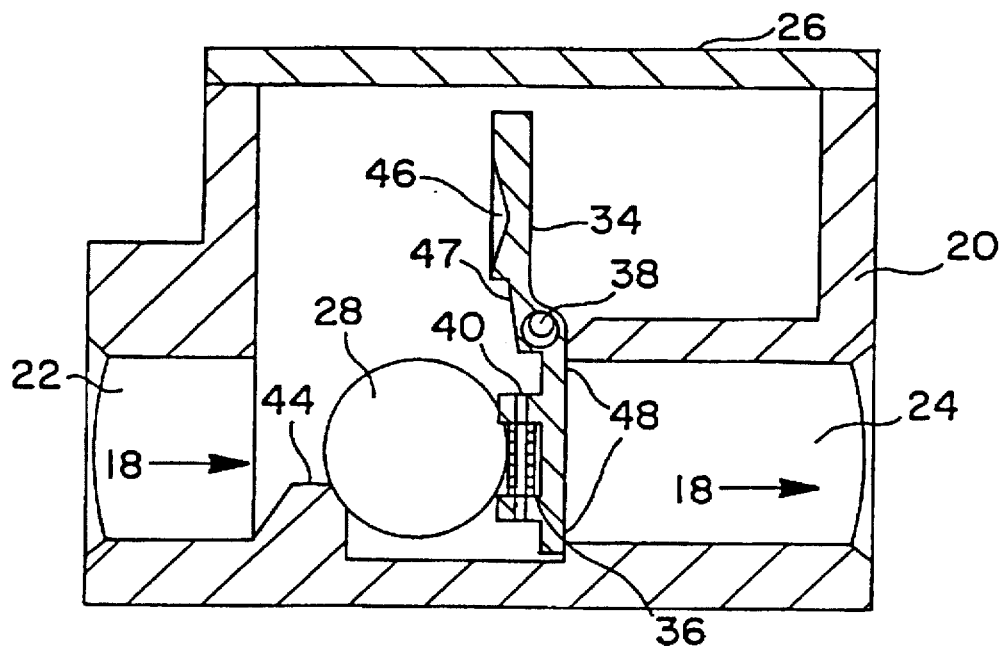
FIG. 3 is similar to FIG. 2, but shows the valve closed and in the off position.
Figure 4:
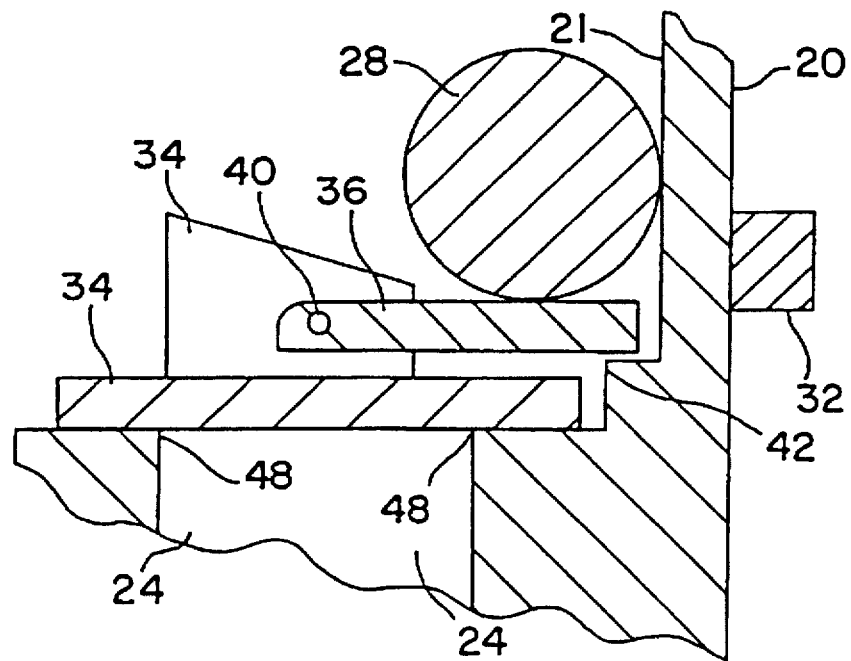
FIG. 4 is an end section detail showing the flapper assembly locked into position by the inertia ball and an external magnet.
Figure 5:
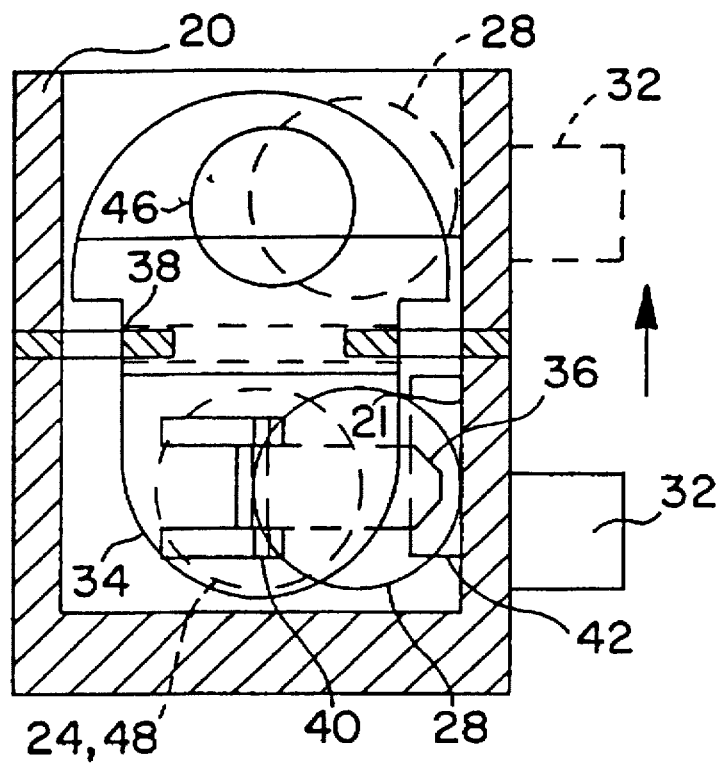
FIG. 5 shows an end cut away section showing the flapper assembly and the movement of the inertia ball and the external magnet.
Figure 6:
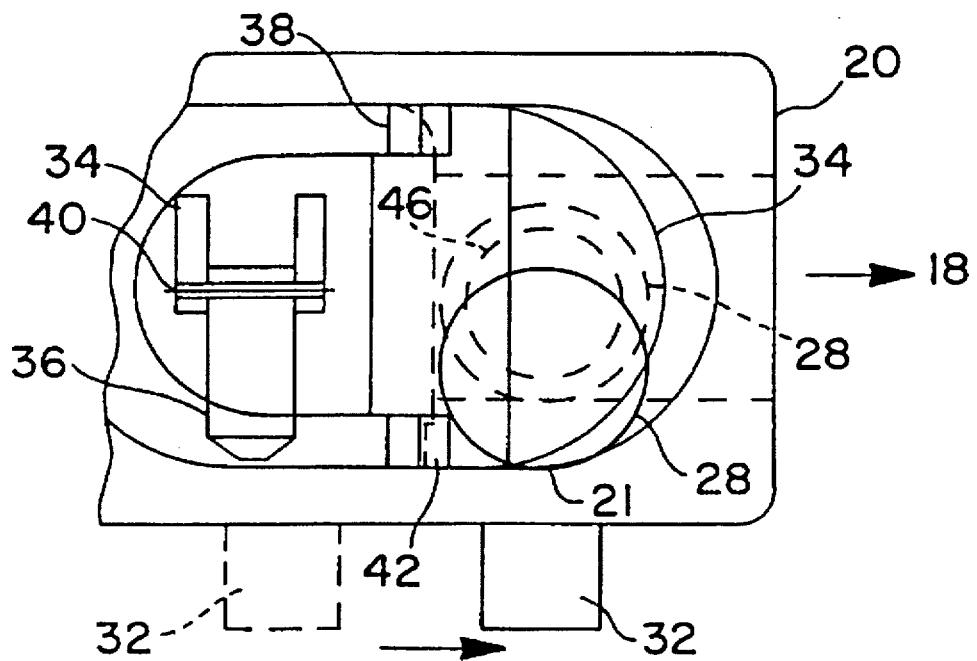
FIG. 6 is a top cut away view showing a final movement of the inertia ball to an open position by the controlled movement of the external magnet.

The operation of the valve to turn on the flow of fluid is manually performed by movement of the external magnet 32 around a path as shown in FIGS. 5 & 6. More specifically, as the external magnet 32 is moved upward along a controlled path, the inertia ball 28 will follow along the surface 21 past the pivot point 38, thus forcing the flapper 34 to rotate and open the valve as shown in FIG. 5. By continuing the movement of the magnet 32 along the given path, the inertia ball comes to rest at the original horizontal position shown in FIG. 6. An additional safety is provided when the external magnet 32 is moved upward along a controlled path, as previously described. Should the flapper 34 fail to rotate into the open position, thus indicating that the fluid pressure differential is greater than the force produced by the magnet 32, this would indicate that the fluid should not be turned on for safety reasons. The external magnet 32 can be moved along the control path in a reverse direction so as to manually activate the valve, when so desired. That is, the magnet 32 would be simply moved up to the position of the inertia ball 28 such that the inertia ball 28 is within the magnetic field of the magnet 32. The attraction between the magnet 32 and the inertia ball 28, and continued movement of the magnet 32 in the left hand direction as viewing FIG. 2, for example, causes the inertia ball 28 to leave the bias recess 46. Continued movement of the magnet 32 can cause the inertia ball 28 to arrive at the closed position as illustrated in FIG. 3.

Figure 7:
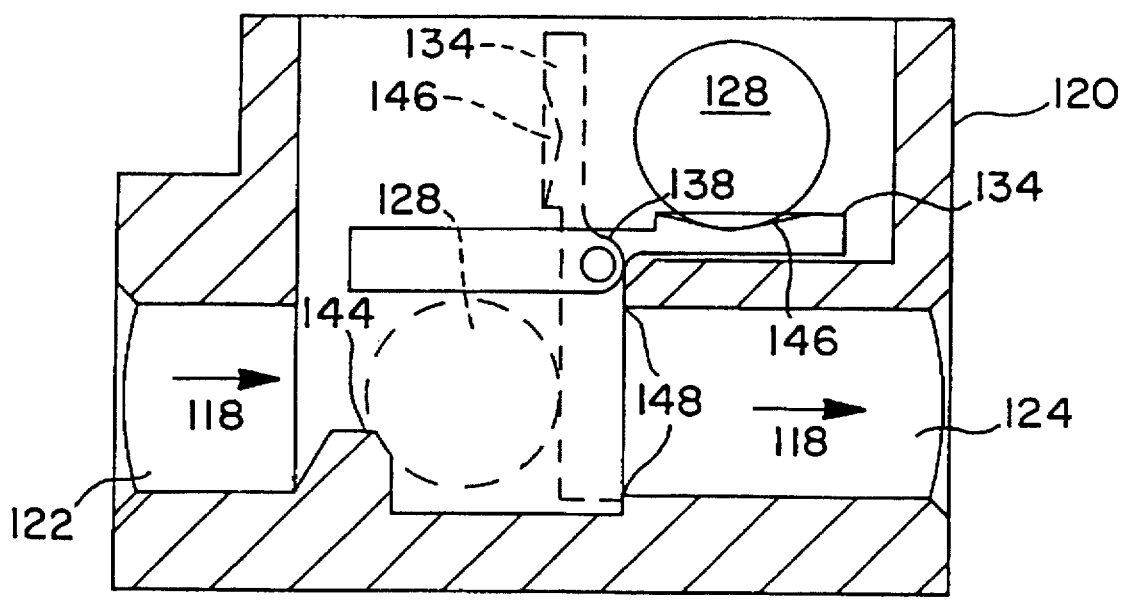
FIG. 7 shows a sectional cut away front view of a modified embodiment similar to FIG. 2.

A modified embodiment of the present invention will now be described with reference to FIG. 7. Similar to the previous embodiment, the valve consists of a closed housing 120 shown without the top cover and having an inlet 122 and an outlet 124. A flapper 134, of another version, is made in one piece, thus eliminating the lever, as shown in FIG. 7. The flow of fluid through the valve is shown by flow arrows 118. An inertia ball 128 is shown in FIG. 7, depicting the movement of the inertia ball 128 from a biased recess 146 to the off position. The operation of the valve is similar to the above embodiment, except the flapper 134 is held in the off position by the inertia ball 128 being forced by the action of gravity and a magnetic force exerted by an external magnet against a ball stop 144 and the flapper 134.

More specifically, the operation of the valve shuts off the flow of fluid during seismic vibration by the movement of the inertia ball 128 out of the biased recess 146 (FIG. 7), past the pivot 138 of the flapper 134, causing the flapper 134 to rotate about the pivot 138 as shown in FIG. 7. The action of gravity on the inertia ball 128 moves the inertia ball to a rest position between the ball stop 144 and the flapper 134, simultaneously entering into the magnetic field of the external magnet, located below the center of the stopped position of the inertia ball 128, thereby applying an additional force onto the flapper 134 and causing a positive sealing off of the fluid flow against the outlet 124. The operation of the valve to turn on the flow of fluid is the same as the previous embodiment. Manual operation of the modified embodiment of FIG. 7 is similar to the above-described first embodiment. That is, the external magnet can simply be moved along the exterior of the housing to move the inertia ball 128 into the closed position illustrated by dashed lines in FIG. 7.

The second embodiment is described in FIGS. 8–13. The safety shut-off valve consists of a closed housing 220 with a top cover 226 fastened by bolts or the like (not shown) and has an inlet 222, outlet 224, and ball seat 248.

Figure 8:
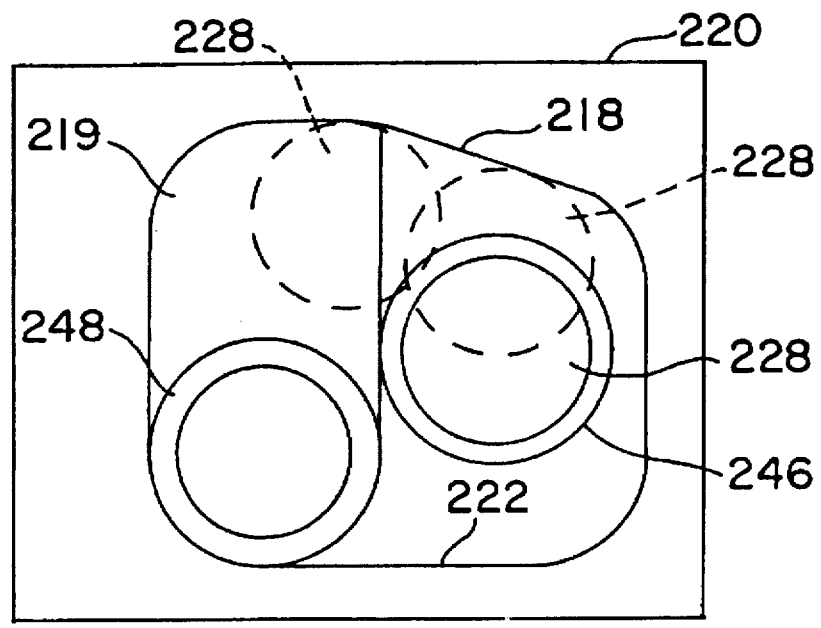
FIG. 8 shows a cut away top view of a second embodiment showing movement of an inertia ball.
Figure 9:
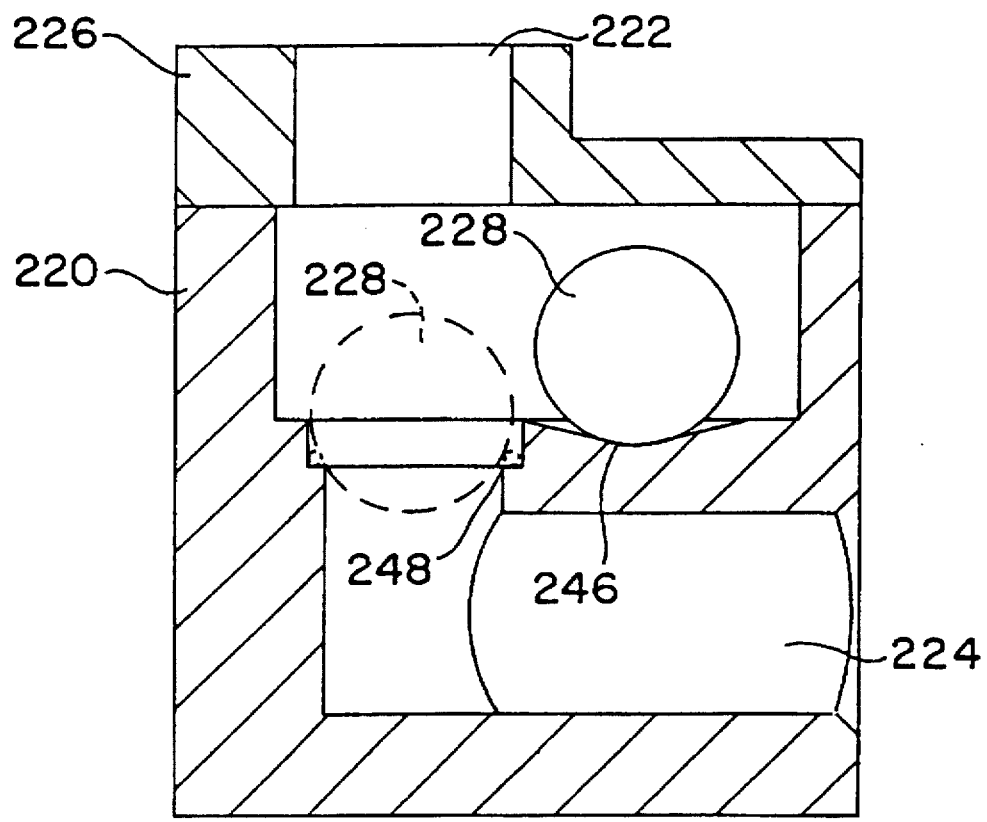
FIG. 9 shows a sectional front view showing the movement of the inertia ball of FIG. 8 into a seat to cut off flow.
Figure 10:
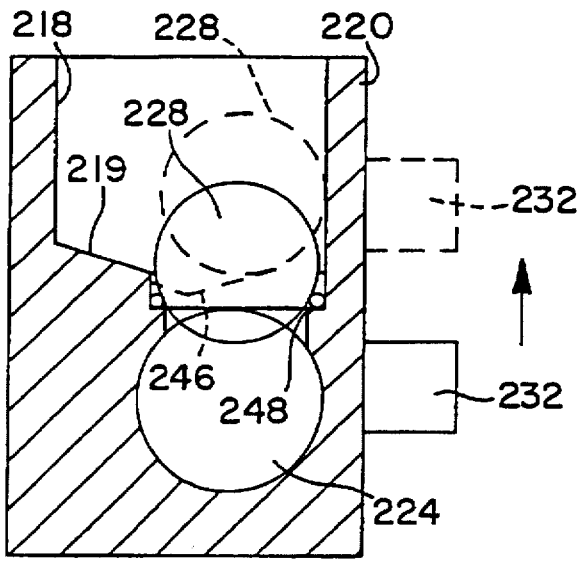
FIG. 10 shows an end section with the inertia ball moved by the magnet near to its final resting position.
Figure 11:
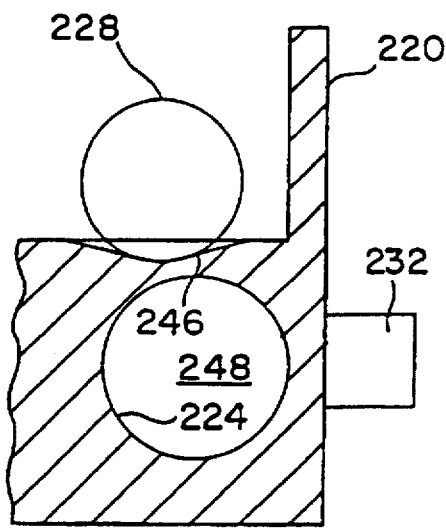
FIG. 11 is an end section showing the final movement of the inertia ball to its original resting position and showing the external magnet as having released the inertia ball.
Figure 12:
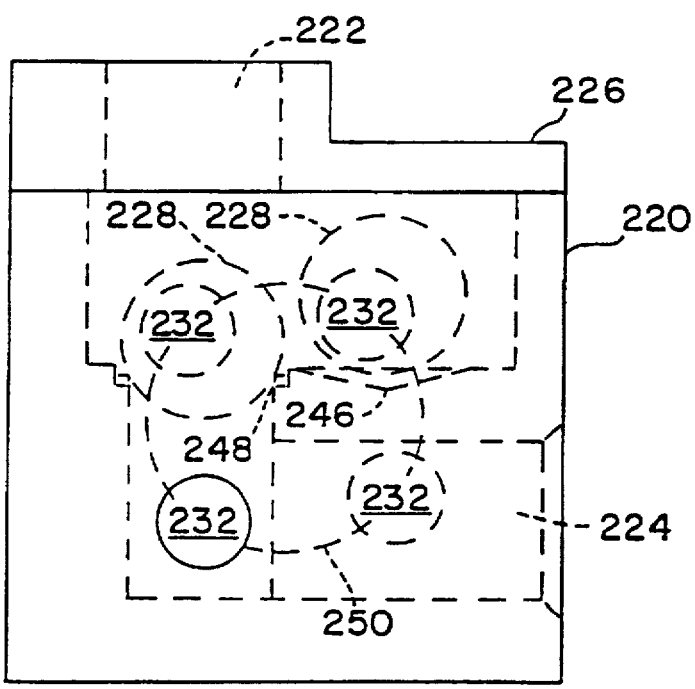
FIG. 12 shows the movement path of the magnet.

The operation of the valve during seismic activity or vibration of a given magnitude causes an inertia ball 228 to move out of a biased recess 246, and as shown FIG. 8, should the inertia ball not fall directly into a valve seat 248, it will be deflected by a vertical surface 218 to a downward positioned surface 219 until it comes to rest on the ball seat 248, thereby stopping the flow of fluid, as shown in FIG. 9. The operation of the valve, to reset the flow of fluid to the on position, is manually performed by the movement of an external magnet 232. Magnet 232 moves along a path (FIG. 12) to cause the magnetic force to overcome a force exerted by gravity and the pressure differential, which causes the inertia ball 228 to be pulled off of the ball seat 248 and come in contact with the wall surface of the housing 220, thus opening the flow of fluid through the valve, as shown in FIG. 10. As the external magnet 232 is moved further along its path, the inertia ball 228 comes in contact with the surface of the biased recess 246, thus stopping the movement of the inertia ball 228. When the external magnet 232 moves to a position that reduces the magnetic force exerted on the ball 238, the inertia ball 238 moves to rest in the biased recess 246.

Similar to the above embodiments, manual activation of the valve can be simply and easily performed by moving the magnet 232 along the path but in the opposite direction employed to reset the inertia ball 228 in the biased recess 246. By rotating or moving the magnet manually, along the previously described path, in the opposite direction, the magnet will attract the inertia ball 228 against the wall surface and will follow along the path until the ball comes in contact with the seat 248. The magnet 232 continues to move to a point where the magnetic attraction is aligned in a manner so as to force the ball into the seat 248, this being the off position. That is, the magnet attracts the inertia ball 228 against the wall of the housing from the biased recess 246, and can then move the inertia ball 228 to the closed position illustrated in FIG. 10. The magnet 232 can then similarly be located in its position attracting the inertia ball 228 into the closed position below the seat 248 as also illustrated in FIG. 10.

Figure 13:
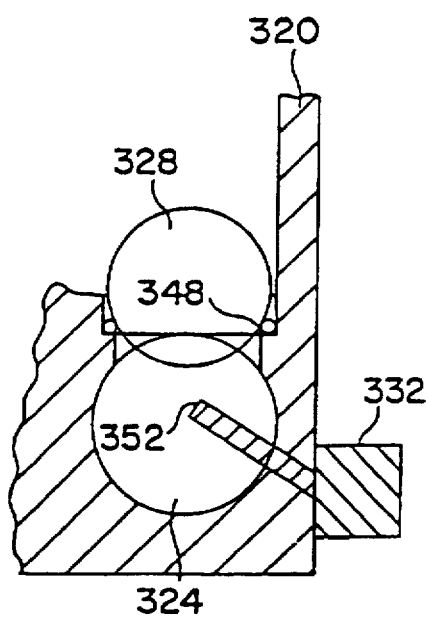
FIG. 13 is a cross-sectional view of a modified embodiment, showing the inertia ball seated and held against its seat by the magnet through a magnetically attractable material.

Another embodiment shown in FIG. 13 shows an inertia ball 328 being held into a seat 348 by the magnetic force exerted by a magnetically attractable material or magnet 352, thereby assuring a more positive seating of the inertia ball 328 into seat 348.

Referring now to FIG. 9, housing 220 has flow-way 250 between inlet 222 and outlet 224. Ball cavity 252 intersects flow way 250 between inlet 222 and outlet 224. Ball 228 is sized to move freely within ball cavity 252. Ball 228 resides in recess 246 when at the open position and rests in seat 248 when at the closed position.

FIGS. 14–24 illustrate a third embodiment according to the present invention, along with modifications thereof. Referring initially to FIGS. 17–20, there is illustrated a housing 420 having a removable top cover 426 and defining a gas inlet 422 and a gas outlet 424. The flow of gas through the housing is illustrated by arrows 418 in the various figures. A flow passage connects the inlet and the outlet. In the flow passage is disposed a valve seat 448 for the receipt of an inertia ball 428 acting as a valve member. In an open position of the valve, the inertia ball 428 is located in a recess 446.

The recess 446 is preferably in the form of an inverted cone. However, the inverted cone recess 446 can advantageously be provided with ridges or raised surfaces 466, as opposed to a smooth flat surface. The advantage of such ridges is that the inertia ball 28 can be dampened or slowed in the recess 446 with the ridges. This helps to prevent the inertia ball from being dislodged from the recess to turn off the valve in situations where the predetermined vibration or seismic shock is not actually present i.e. this helps to prevent false tripping of the valve. Further, the dampening function provided by the ridges prevents the ball 428 from becoming dislodged at its natural frequency.

Figure 14:
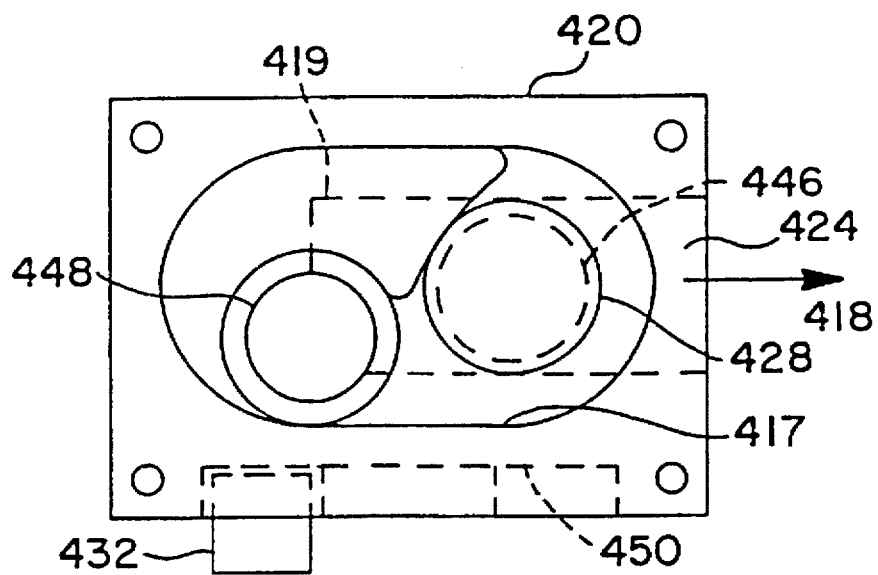
FIG. 14 is a top view, with a cover removed, of a third embodiment according to the present invention.
Figure 15:
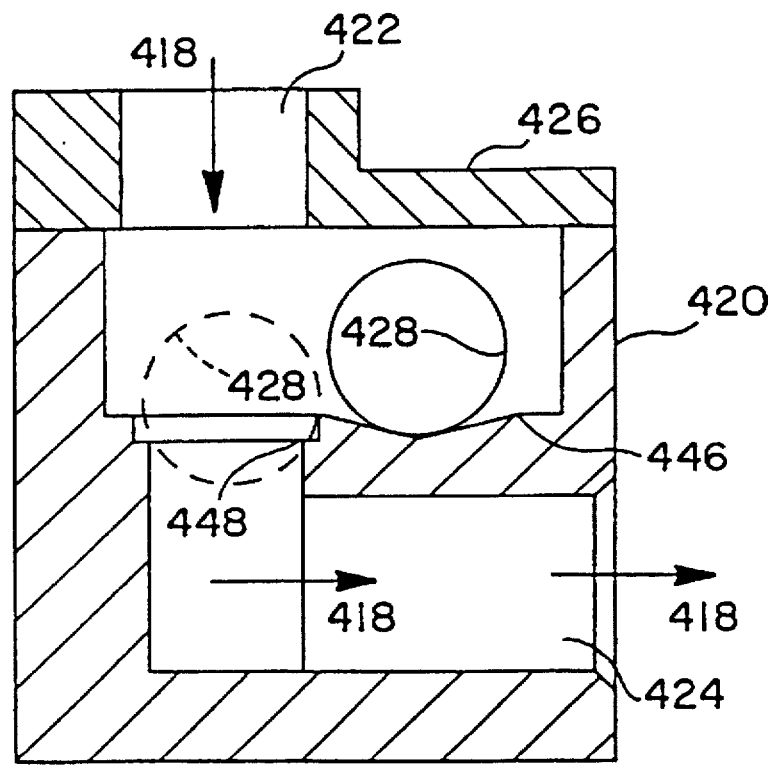
FIG. 15 is a sectional side view of the embodiment of FIG. 14.

Turning again to FIGS. 14–17, it can be seen that the recess 446 is positioned inside the housing 420 to enable the inertia ball 428 to be dislodged therefrom and fall onto the valve seat 448 so as to close the valve upon the occurrence of a vibration or seismic shock of a predetermined magnitude. The inertia ball 428 can deflect off of a vertical surface 417 inside the housing 420. An angled or sloped surface 419 is also provided inside the housing, as best seen in FIG. 14, to help direct the inertia ball into the valve seat 448. By the ball being able to deflect off of the vertical surface 417, the ball is allowed to move onto the angled surface no matter in what direction the inertia occurs.

Figure 16:
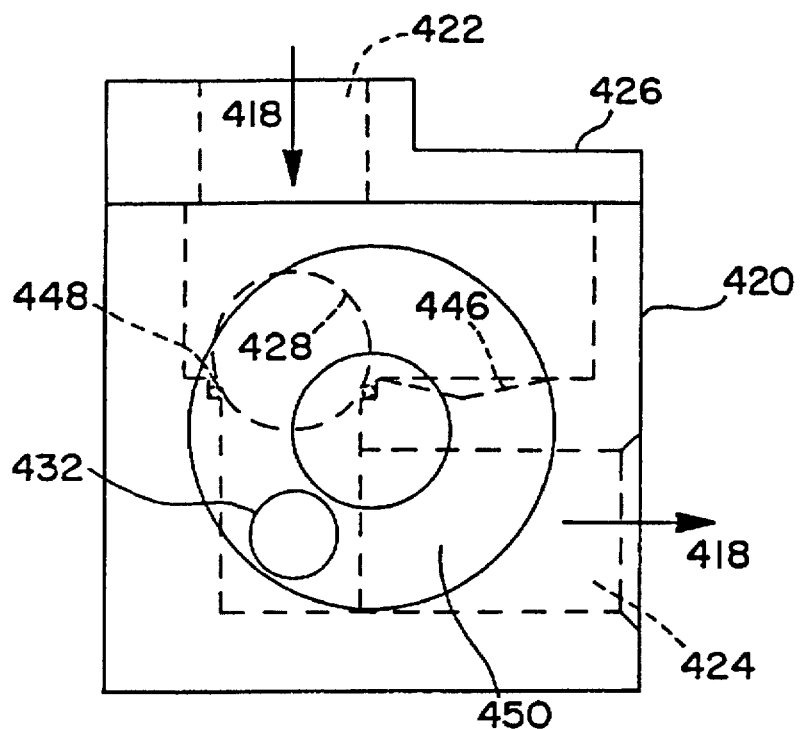
FIG. 16 is a side view of the third embodiment with the internal features thereof shown in dashed lines.

Provided on the outside of the housing 420, opposite to the vertical surface 417, is a magnet path groove 450. A magnet 432 is disposed in this groove 450. Thus, the magnet 432 is movable in the magnetic path groove 450 between a sealing position, as illustrated in FIG. 16, with the magnet below the valve seat 448 and attracting the inertia ball 428 onto the valve seat, to a reset position at the recess 446 for moving the inertia ball 428 from the valve seat 448 onto the recess 446. Thus, not only does the force of gravity and the fluid pressure in the direction illustrated by arrows 418 hold the inertia ball 428 on the valve seat 448, but the magnet 432, being positioned at the sealing position illustrated in FIG. 16, applies an additional magnetic force to effect a better seal.

Figures 17, 18:
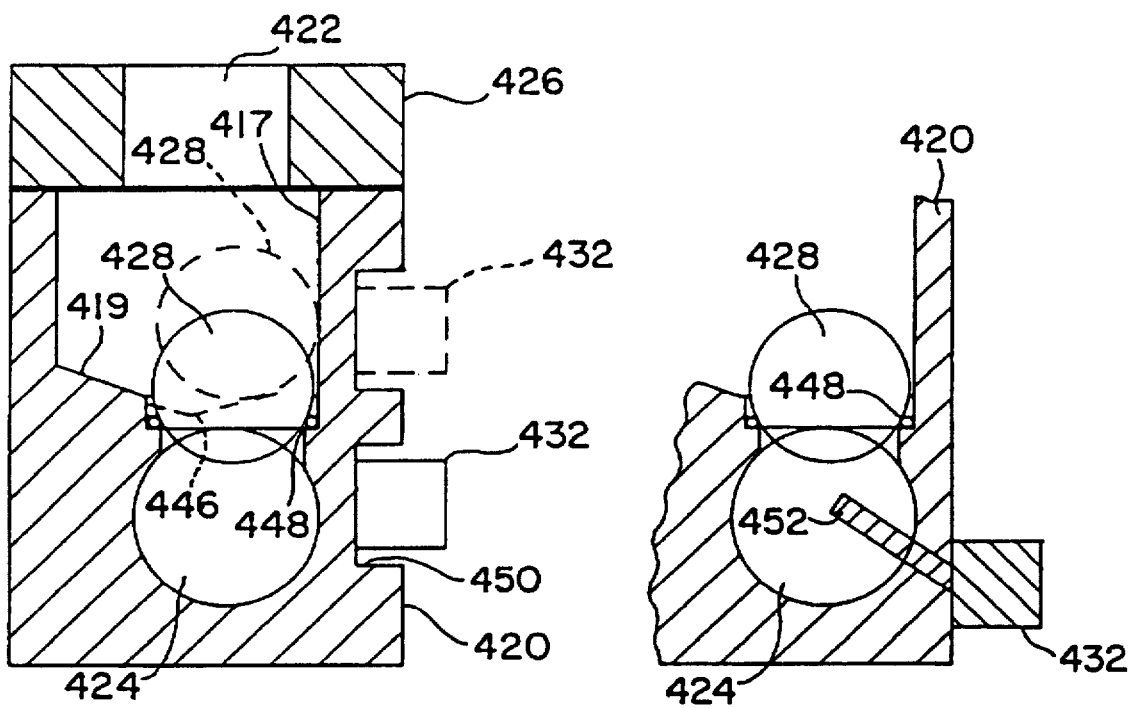
FIG. 17 is a front sectional view of the third embodiment according to the present invention illustrating the movement of a magnet and an inertia ball.
FIG. 18 is a front sectional view similar to FIG. 17 but illustrating a modification of the third embodiment.

As can be seen from the dashed line position in FIG. 17, the inertia ball 428 can be moved off of the valve seat 448 back to the recess 446 by the movement of the magnet 432. The ball 428 follows the magnet 432 along the inner vertical wall 417. Noting the magnet path groove 450, one advantage of this groove, in addition to guiding the magnet 432, is that the wall thickness along the groove is reduced, allowing the magnet 432 to be located closer to the inertia ball 428. Outside of the groove, the thickness of the wall of the housing 420 is sufficiently thick to provide a strong structure. Similarly to the above-described embodiments, the magnet 432 can also be moved in the groove 450 to manually trip or activate the earthquake safety valve.

Similarly to the embodiments discussed above, a magnetic transfer member 452, made of a magnetic material, can be provided in the housing below the valve seat 448 in order to transfer the magnetic force closer to the inertia ball 428, thus supplying an additional force to hold the ball 428 in the closed position of the valve. Note that the member 452 could also be a magnet in itself, in this case the magnet 432 then being a much stronger magnet which still can unseat the inertia ball 428 when moving the inertia ball 428 from the closed position to the reset position in the recess 446. The inertia ball 428, by the provision of a magnetic force holding it onto the valve seat 448, is thus more securely held in place.

Figure 19:
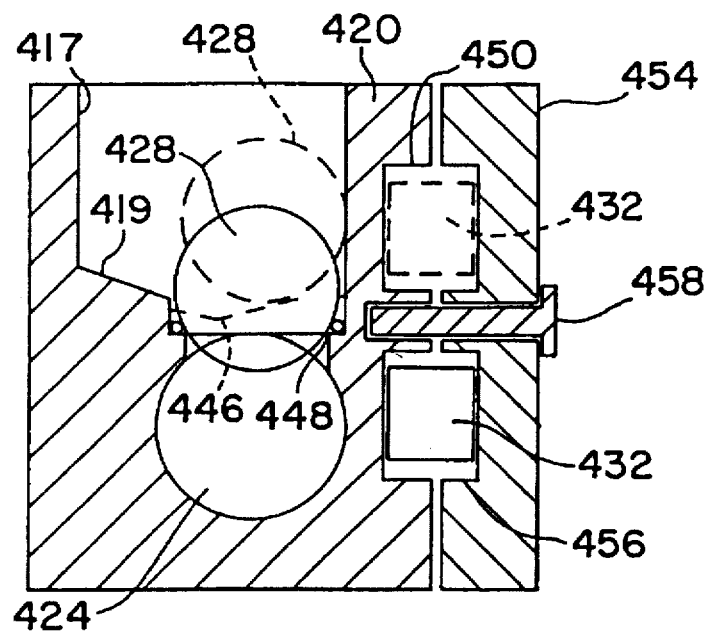
FIG. 19 is a further front sectional view according to the third embodiment, in particular illustrating a magnet drive member.
Figure 20:
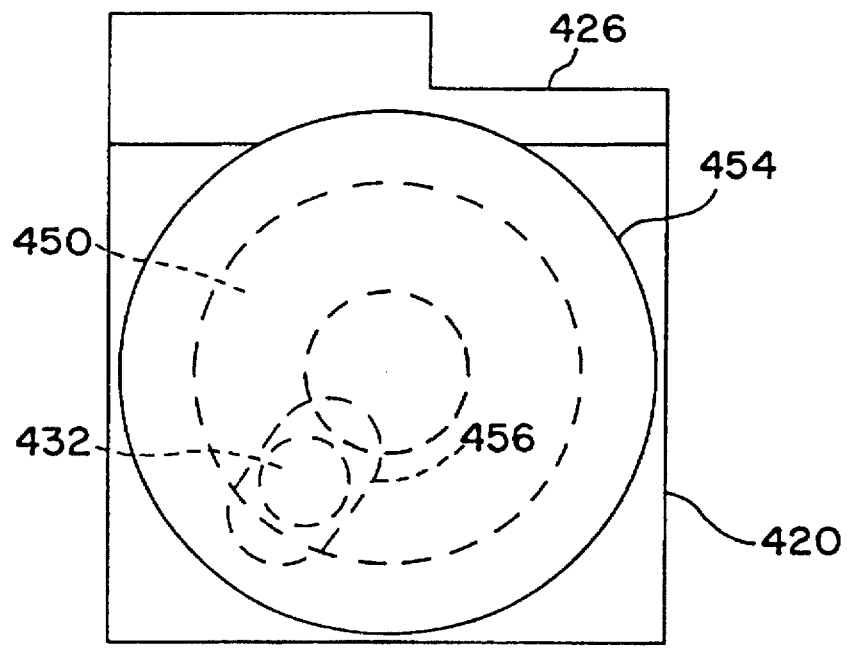
FIG. 20 is a side view of the apparatus as illustrated in FIG. 22.

Noting FIGS. 19 and 20, there is illustrated a drive member 454 rotatably mounted on the housing 420 by a pivot pin 458. The drive member 454 is provided with a drive slot 456, the drive slot 456 engaging the magnet 432 located in the magnet path groove 450. Thus, by rotation of the drive member 454, the magnet 432 can be moved between the sealing and reset positions. It is noted that though the magnetic path groove 450 is circular, the drive slot 456 can allow the path to be of almost any shape, because the drive slot is elongated and can allow for some movement of the magnet 432 in the radial direction of the drive member 454. The drive member 454 can thus make it easier to reset the valve, or to manually activate the valve as discussed with the above embodiments.

Figure 21:
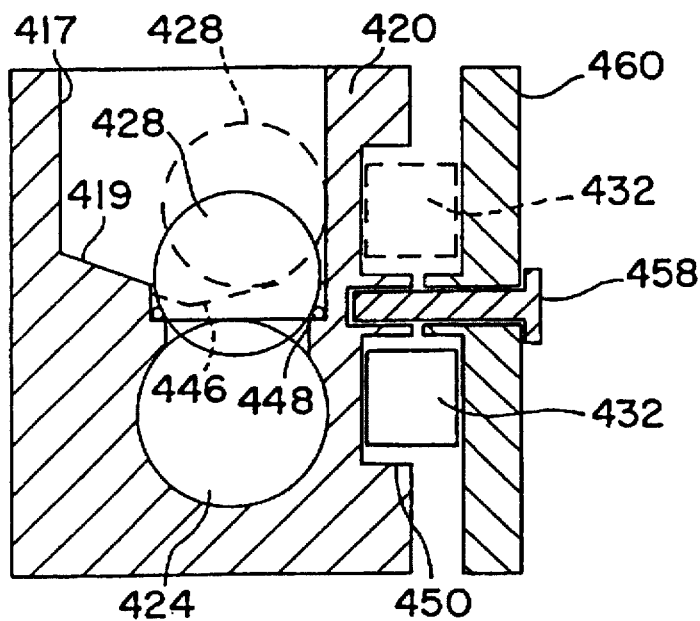
FIG. 21 is a view similar to FIG. 20, but illustrating a drive lever for moving the magnet.
Figure 22:
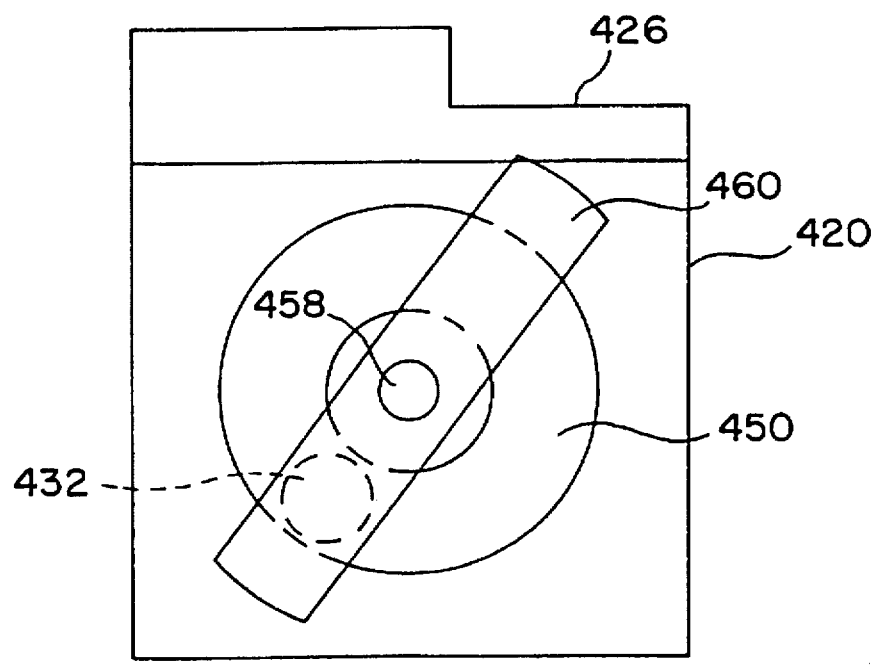
FIG. 22 is a side view of the apparatus illustrated in FIG. 21.

An alterative to the above-described drive member 454 is illustrated in FIGS. 21 and 22. In these figures, the drive member 454 is replaced by a drive lever 460. In this case, the magnet 432 is simply fixed to the lever 460.

It is noted that in both the situation of the drive member 454 and the drive lever 460, a suitable catch or detent could be provided so as to hold the drive member or lever in the sealing position or any other desired position.

Figure 23:
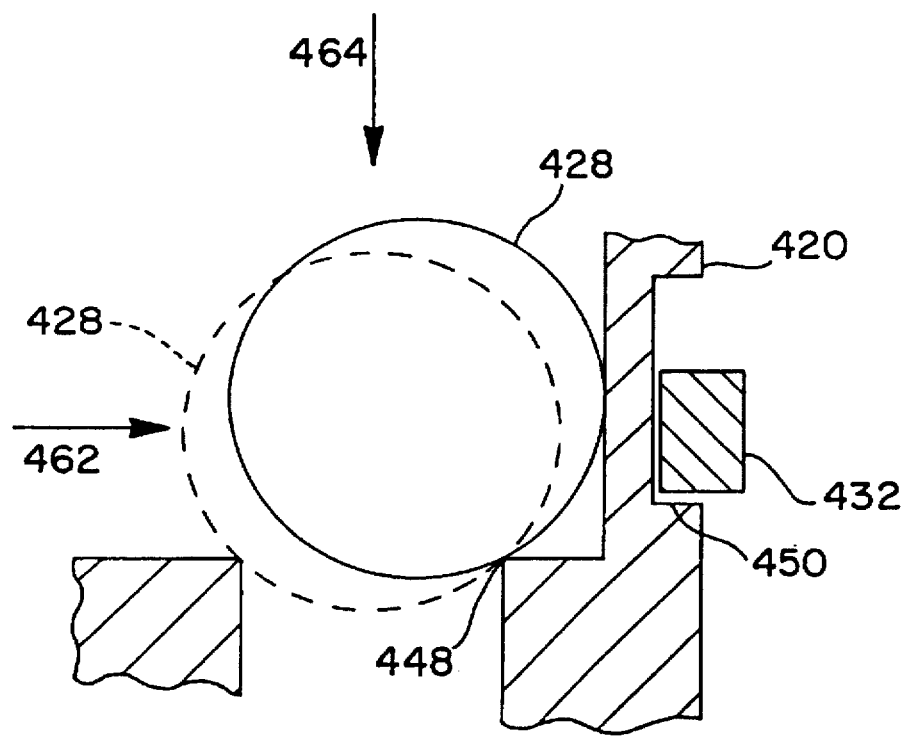
FIG. 23 is a partly sectional detailed view of movement of the inertia ball out of a valve seat.

Referring now to FIG. 23, the action of the magnet 432 moving the inertia ball 428 from the valve seat 448 is described. When the magnet 432 reaches a point along the magnet path groove 450 wherein it is sufficiently close to the ball, the ball will pivot out of the valve seat 448 and will follow the magnet 432 along the same path as the magnet path groove 450. Lifting the inertia ball 428 out of the valve seat 448 in this manner provides a significant advantage over attempting to lift the inertia ball 428 off of the valve seat 448 from above.

Figure 24:
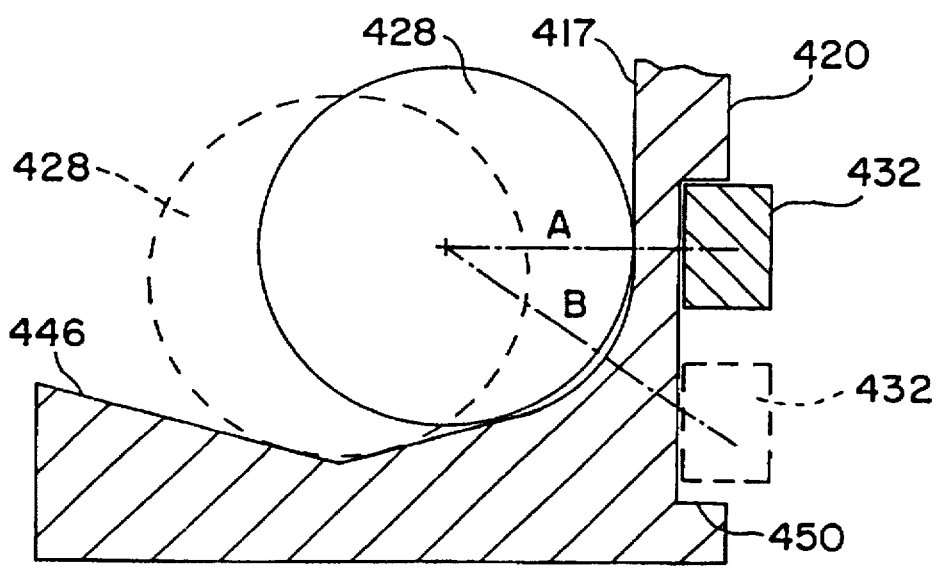
FIG. 24 is a partly sectional detailed view of movement of the inertial ball into a recess.

Referring now to FIG. 24, there is illustrated the deposition of the inertia ball 428 into the inverted cone recess 446. The external magnet 432 is moved along the path 450, and as the magnet 432 moves downward, the distance from the inertia ball 428 increases. For example, note that distance B is greater than distance A. When the distance between the magnet 432 and the inertia ball 428 has become sufficiently great, the magnet 432 will release the inertia ball 428, allowing the ball to be reseated in the inverted cone recess. The inertia ball 428 is in this manner returned to the open position of the valve.

It is noted that, of course, the inlet of the housing 422 does not necessarily need to go through the top 426. The inlet and the outlet could be arranged in any suitable manner still allowing for the operation of the valve according to the present invention. In addition, the housing 420 can of course can be provided with threads or other suitable connectors for connecting pipe fittings.

Figure 25:
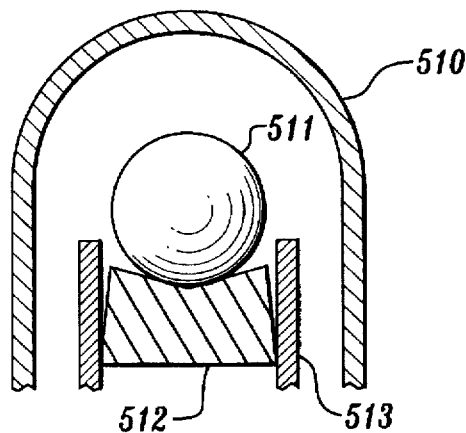
FIG. 25 is a sectional view of a valve activating portion of a prior art safety valve.
Figure 26:
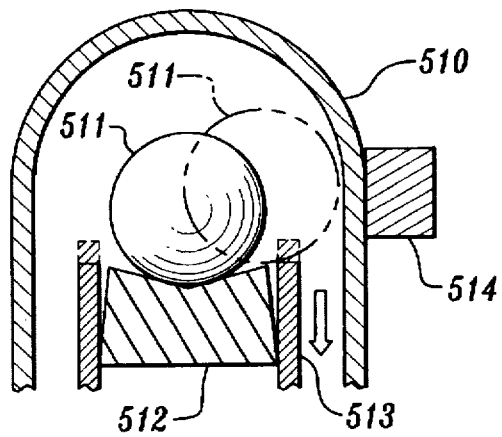
FIG. 26 is a sectional view of the manual operation feature according to the present invention applied to the prior art safety valve of FIG. 25.

FIG. 25 illustrates the activating portion of the Keller patent, U.S. Pat. No. 4,475,565, discussed in the Background of the Invention. For ease of discussion, this patent is incorporated herein by reference. Reference number 510 represents a housing and has therein a ball 511 supported on a pedestal 512. Earthquake or other shock forces will displace the ball 511 from the pedestal 512 such that the ball 511 contacts the upper end of a tube 513. The tube 513 is vertically movable, and by the weight of the ball 511 engaging the top of the tube 513, the tube 513 is moved downward in order to actuate a valve or other control device. Referring now to FIG. 26, a magnet 514 is seen as located adjacent to the exterior of the housing in accordance with the present invention. A magnet 514 can be provided in a manner similar to the embodiments discussed above so as to be movable in and out of the range where the ball 511 on the pedestal 512 would enter the magnetic field of the magnet 514. By the magnet 514 moving such that the ball is in its magnetic field, the magnet 514 attracts the ball 511 toward it as illustrated by the dashed lines in FIG. 26. This causes the tube 513 to move downward, as discussed above, and as illustrated by the arrow in FIG. 26. Thus, similarly to the above embodiments, manual actuation of the device can be simply and easily provided by the provision of a permanent magnet 514 on the outside of the housing movable between positions adjacent to and away from the ball 511.

Similarly to the above embodiments, the magnet 514 can be moved away from the ball 511 after activating the device such that the ball 511 will return to its position centered atop the pedestal 512. This would then allow for the valve or other device actuated by the tube 513 to be reset. A suitable groove for the magnet 514, as well as a drive member or lever, as discussed with respect to the above embodiments, could also be provided with this arrangement.

Figure 27:
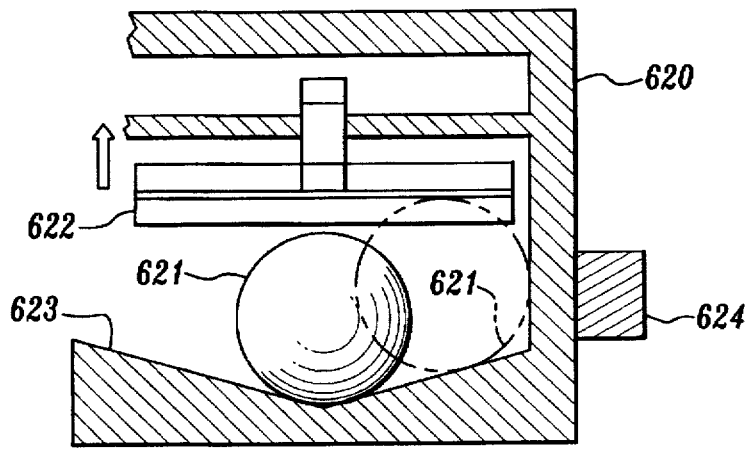
FIG. 27 is a partly sectional view of another embodiment of the present invention.

FIG. 27 illustrates an application of the present invention to the safety shutoff device of U.S. Pat. No. 4,903,720 to McGill, also discussed in the Background of the Invention, and also incorporated herein by reference. In this device, a housing 620 contains a movable member 622 that is engageable by an inertia ball 621. The inertia ball normally rests in the center and lowest (as illustrated) position of a recess 623 so as not to engage the member 622. However, upon seismic shock or vibration or other suitable force, the ball will move in the recess 23 to engage and move the member 622. The movement of the member 622 can thus be used to activate other devices, such as safety valves. This is further discussed in the McGill patent.

Similarly to the above embodiments, a manual activation feature according to the present invention can be applied to the housing 620. That is, a magnet 624 can be provided on the outside of the housing movable into and out of a position in which the inertia ball 621 will be within the magnetic field of the magnet 624 such that the inertia ball 621 will engage the member 622. A suitable groove, drive member or lever could also be provided with this embodiment for operation of the magnet for manual activation.

Figure 28:
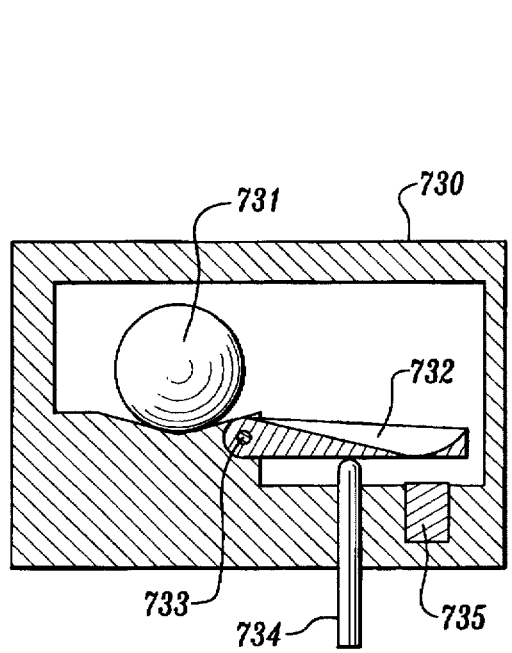
FIG. 28 is a partly sectional view of an activating portion of another prior art safety shutoff apparatus.

FIG. 28 illustrates the activating portion of the prior art device disclosed and claimed in U.S. Pat. No. 5,119,841 to McGill, also discussed above, and also incorporated herein by reference. In this device, a housing 730 has an inertia ball 731 resting in recess 733. Upon the application of seismic shocks or vibrations, or other appropriate forces, the inertia ball 731 may leave the recess 733 and fall onto a slanted lever 732. The slant of the lever 732 causes the inertia ball 731 to roll toward the distal end of the lever 732. At this point, the inertia ball 731 is attracted by a permanent magnet 735 located below the lever 732. This causes the inertia ball 731 to move toward the magnet 735, thus also causing the lever 732 to move downwardly and move an activating member 734 downwardly as well. This activating member 734 could be employed in a manner similar to the above embodiment of FIG. 27, such as to activate a seismic safety valve or other device.

Figure 29:
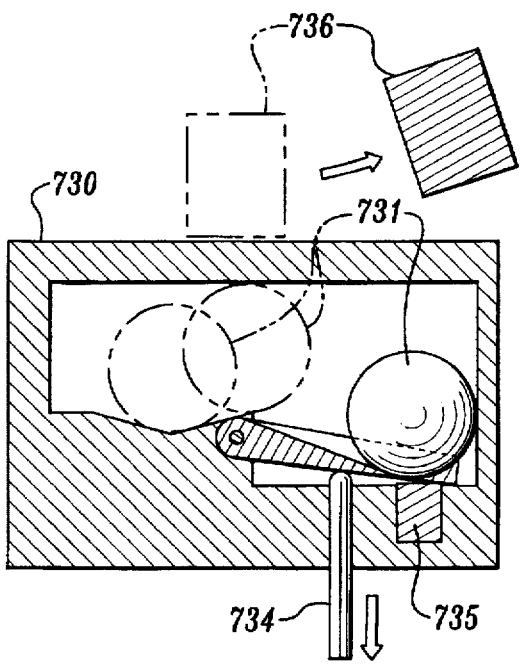
FIG. 29 is a partly sectional view of the manual operation feature according to the present invention applied to the prior art safety shutoff apparatus of FIG. 28.

FIG. 29 illustrates the application of the manual shutoff feature according to the present invention to the prior art of FIG. 28. Specifically, a magnet 736 can be provided that is movable exterior of the housing. Specifically, the magnet 736 can move to a position in which it attracts the inertia ball toward it, away from the recess 733. The magnet 736 can then continue to move so as to release the inertia ball 731 to allow the inertia ball 731 to fall onto the lever 732, and subsequently operate in the manner described above with respect to FIG. 28. One possible path of movement is illustrated by the arrow and the dashed line magnet 736 illustrated in FIG. 29. In this embodiment, the movement and position of the magnet are provided such that the inertia ball 731 is not only moved off of the recess 733, but also moved toward the lever 732, toward the right in the housing as seen in FIG. 29. The movement of the magnet 736 must also continue so as to ensure the release of the inertia ball 731 from its magnetic field so that the inertia ball 731 will drop onto the lever 732. Similarly to the above embodiments, a suitable groove, drive member or lever could be provided for appropriately moving the magnet 736 in a correct path adjacent to or on the housing 730.

Figure 30:
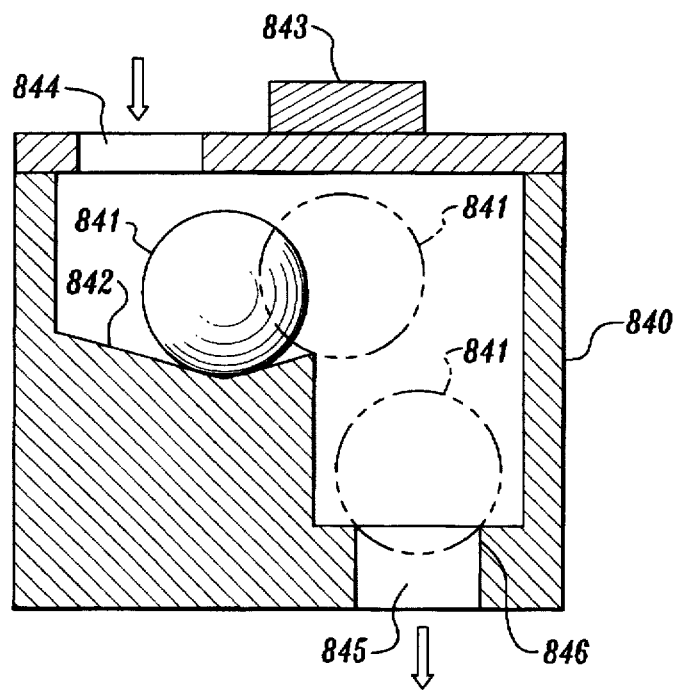
FIG. 30 is a partly sectional view of yet another embodiment according to the present invention.

FIG. 30 illustrates an alternate embodiment in which a housing 840 has an inertia ball 841 resting in a recess 842. A gas inlet 844 is provided at the top of the housing, and a gas outlet 845 is provided at the bottom of the housing. The inertia ball is capable of movement and responds to suitable shock or vibration, such as seismic shocks, so as to be dislodged from the recess 842 and fall onto a valve seat 846 so as to close the valve. This is similar to the embodiment as described above, for example, with reference to FIG. 14. In this embodiment, however, it is noted that a magnet 843 could be applied from the top of the housing to attract the inertia ball 841 off of the recess 842 toward the magnet 843. Subsequent movement of the magnet 843 away from the housing thus allows the inertia ball 841 to drop onto the valve seat 846 for manual activation of the valve. Note that in this embodiment, as, indeed, in most of the embodiments described above, the magnet could be simply held in the hand to manually activate the valve. In addition to activating the inertia ball 841 from the top, however, the ball could also be activated from the side.

Thus the present invention provides an easy way of manually shutting off a seismic valve, or, indeed, any seismic safety device employing an inertia ball as discussed above. The manual shut-off feature for earthquake safety devices as described in the present application has many advantages over devices that do not employ such a feature. Standard shutoffs that are provided by gas companies can become stuck to the point that they cannot be turned off with reasonable effort, and may require the use of tools or some degree of physical strength to shut them off. Having a simple and easy to use manual feature also adds additional safety, giving the customer an easy way of shutting off the gas supply without the need for tools, when the need to shutoff the gas supply occurs, such as when a gas leak is found. Thus if the valve is actuated as a result of an earthquake, and then subsequently reset in order to restore the gas supply, and a leak is then subsequently detected, the consumer is easily able to shutoff the valve. Without this feature, the consumer would have to attempt to find some other way of shutting off the gas.

The manual shutoff feature for a seismic safety device according to the present invention can be characterized, with respect to all of the embodiments described above, as including a housing that has an internal space and an external surface, with the seismic safety activating mechanism inside the housing, the seismic safety activating mechanism including the inertia ball recess, the inertia ball located in the recess in an unactuated position, and movable to an actuated position upon seismic shocks or vibrations, and an engagement component inside the housing at the actuated position for engagement with the inertia ball when the inertia ball is displaced from the unactuated position. As can be seen from the descriptions of the above embodiments, the engagement component can take many different forms. For example, in the embodiment as shown in FIG. 2, the engagement component takes the form of the flapper valve and the stop 44, the inertia ball 28 engaging both of these in the closed position of the valve. In the embodiment of FIG. 5, the engagement component is the flapper valve 34. Similarly, in the embodiment of FIG. 7, the engagement component is the stop 144 and the flapper 134. However, in the embodiment of FIG. 9, the engagement component is the valve seat 248 for the inertia ball 228. In the embodiment of FIG. 26, however, the engagement component is the movable tube 513 that is engaged at the top surface thereof by the inertia ball 511. In the embodiment of FIG. 27, the engagement component is the movable member 622 that is engaged by the inertia ball 621. And in the embodiment of FIG. 29, the engagement component is the pivotable member 732 that receives the inertia ball 731 in the actuated position. Similarly to the embodiments described above, in the embodiment of FIG. 30, the engagement component is the valve seat 846.

In each of these embodiments, there is provided a means for manually moving the inertia ball from the unactuated position to the actuated position to engage the engagement component.

The manual shutoff feature according to the present invention can be adapted for remote activation, as well as direct activation by the hand of the consumer or user. For example, in many instances certain gas or fluid pipes may be buried underground. In those cases, it may be desirable to provide a seismic safety valve or other device in those pipes at a location below ground level. However, if they are located below the ground level, it would still be desirable to have the ability to both manually activate and manually reset the seismic safety valve or seismic safety device. Thus, a device employing the permanent magnet activator of the present invention could be employed by providing a connection to the ground surface for activation thereat. One example of such a device is described below.

Figure 31:
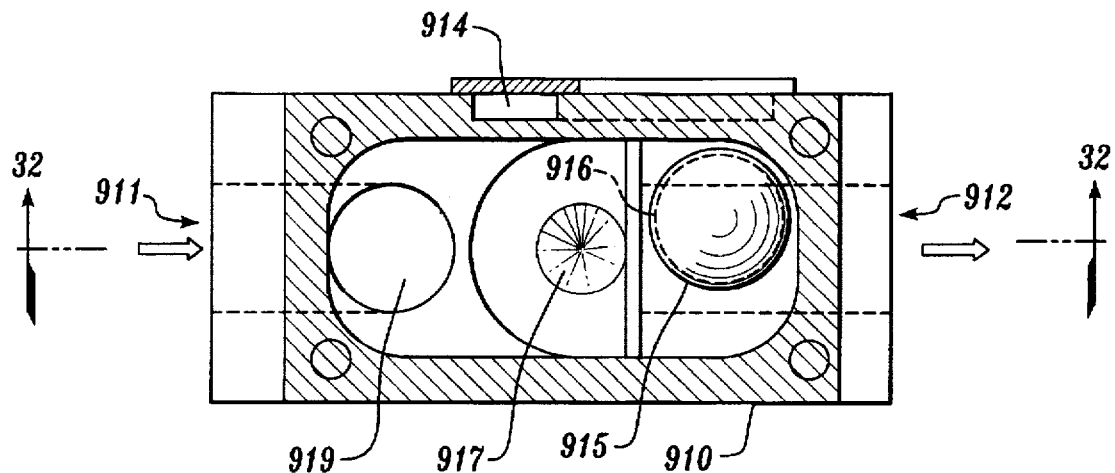
FIG. 31 is a top view of a safety shutoff apparatus according to a further embodiment of the present invention.
Figure 32:
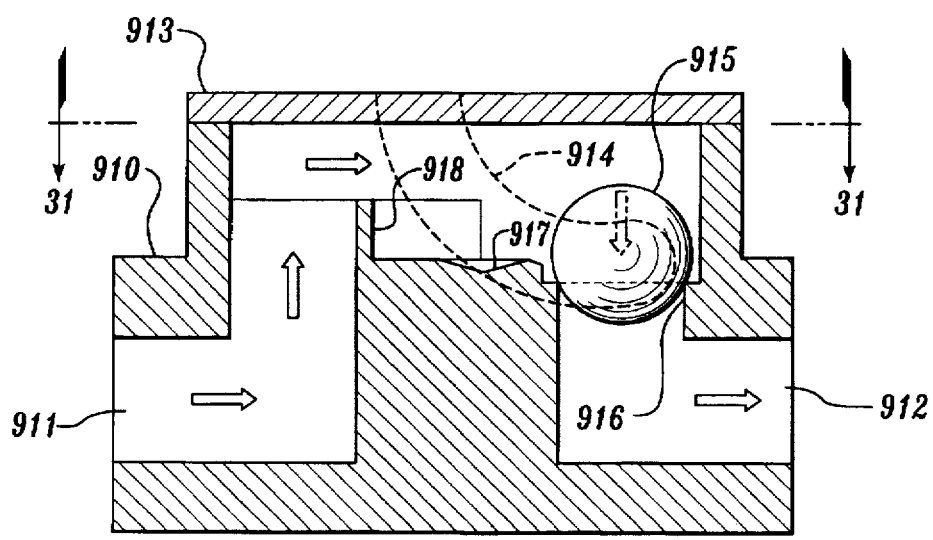
FIG. 32 is a cross-sectional side view of the apparatus in FIG. 31.

FIGS. 31 and 32 show an earthquake safety valve similar to those discussed above in top and lateral section views of the valve in an off position. An inertia ball 915 is illustrated as resting on a valve seat 916 preventing the flow of gas through the valve. The flow of gas is illustrated in the figures by the arrows.

The housing 910 has a gas entrance 911 and a gas exit 912. The housing 910 further has a top cover 713. A magnet groove 914 is formed on the side of the housing so as to form a path for a permanent magnet along the side of the housing. As can be seen from FIG. 31, a suitable plate can cover the groove 914 to isolate and restrict the path of the magnet. An interia ball recess 917 is provided adjacent to a backstop 918, whose function will be explained below.

Figure 33:
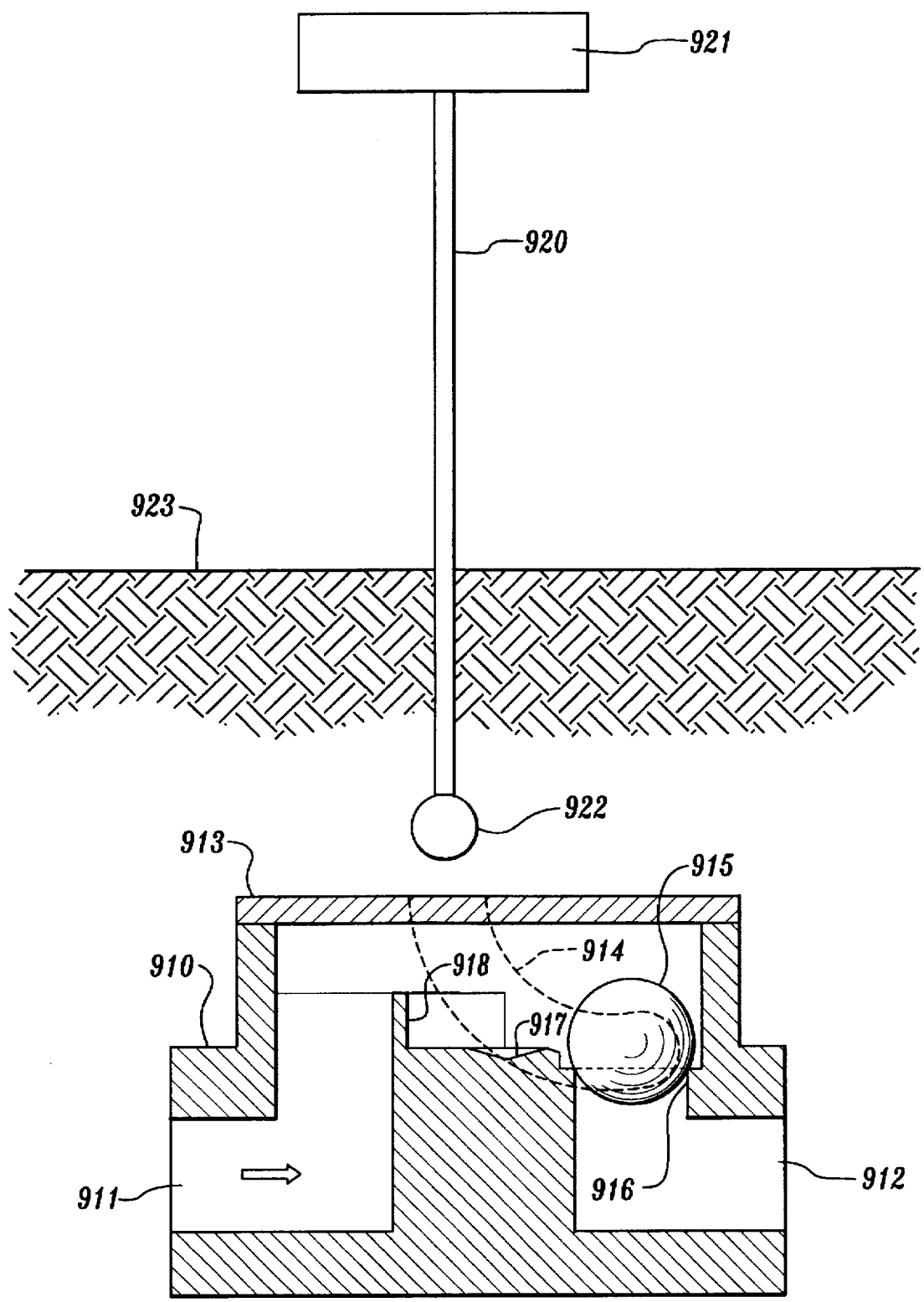
FIG. 33 is a partly cross-sectional side view of the safety shutoff apparatus of FIG. 31 together with a tool for resetting an inertia ball.

Referring now to FIG. 33, reference numeral 923 represents the ground. In some applications, it will be desired to have the valve located below ground in an underground pipe for gas. For the purpose of resetting the valve, then, an appropriate tool having a handle 921 connected to a flexible rod 920 with a magnet 922 at the end of the flexible rod 920 is provided. A suitable opening or tube can be provided from the surface of the ground 923 down to the external groove 914 on the valve housing 910.

Figure 34:
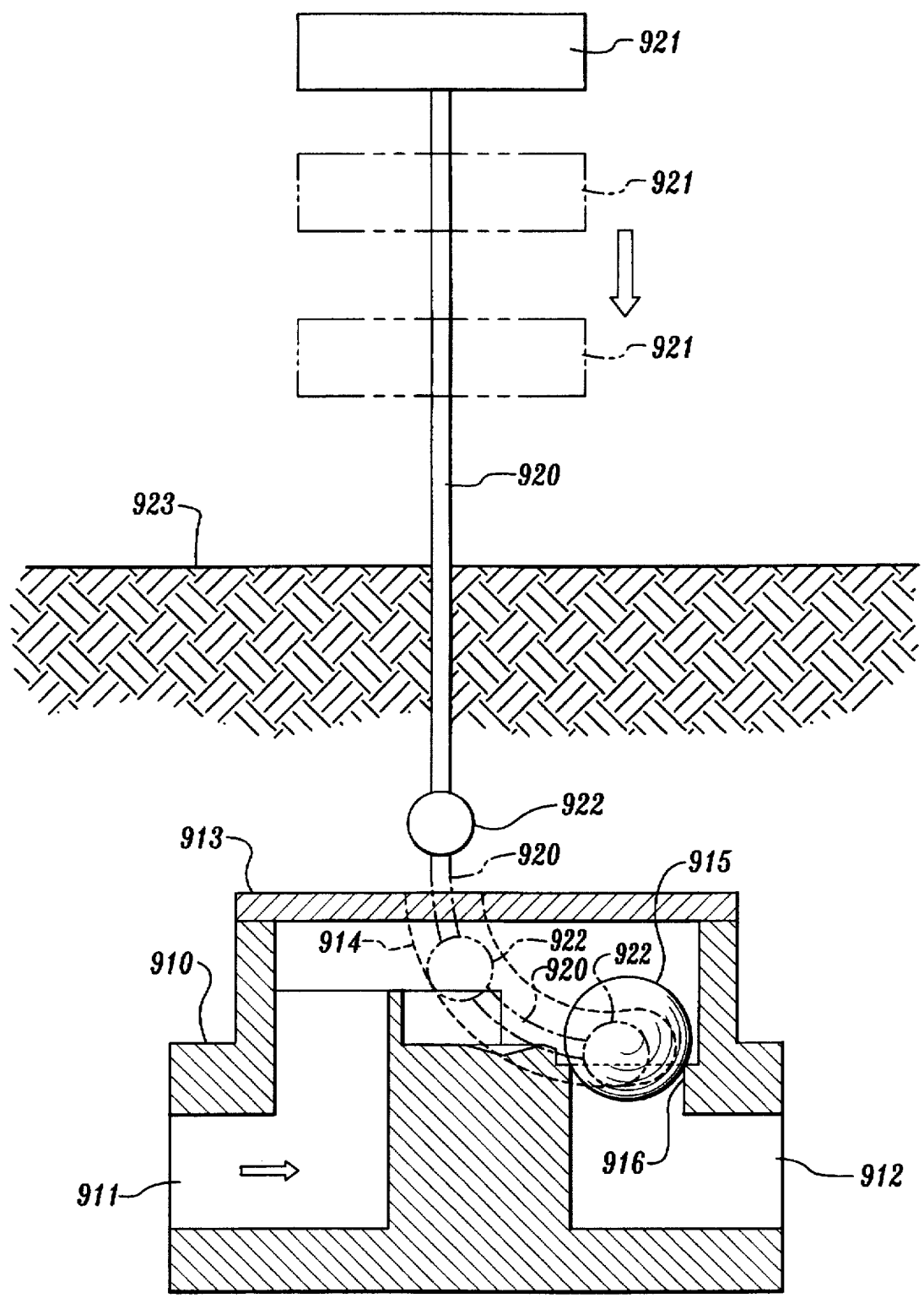
FIGS. 34–36 illustrate the operation of the safety shutoff apparatus and tool as illustrated in FIG. 33.
Figure 35:
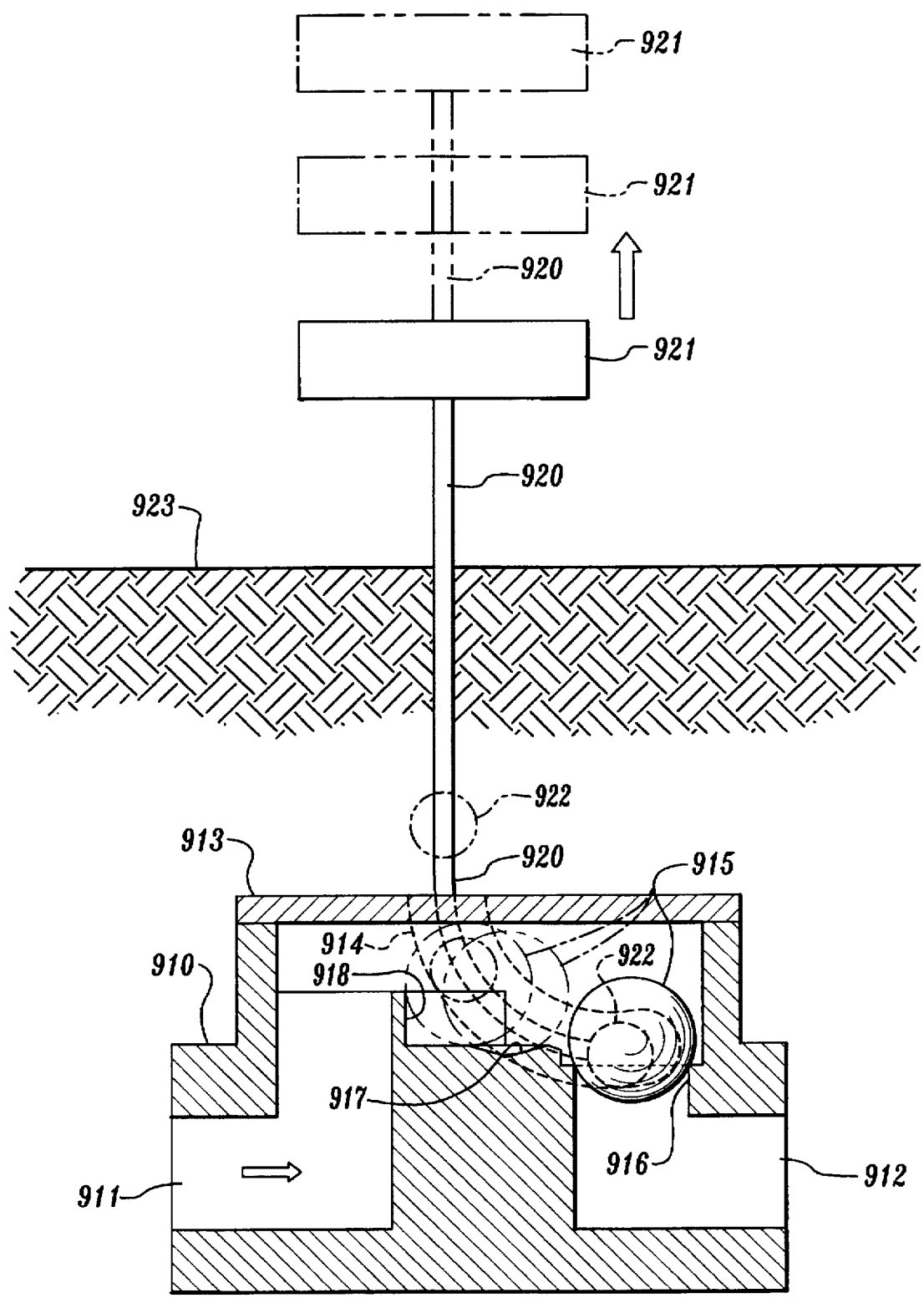
Figure 36:
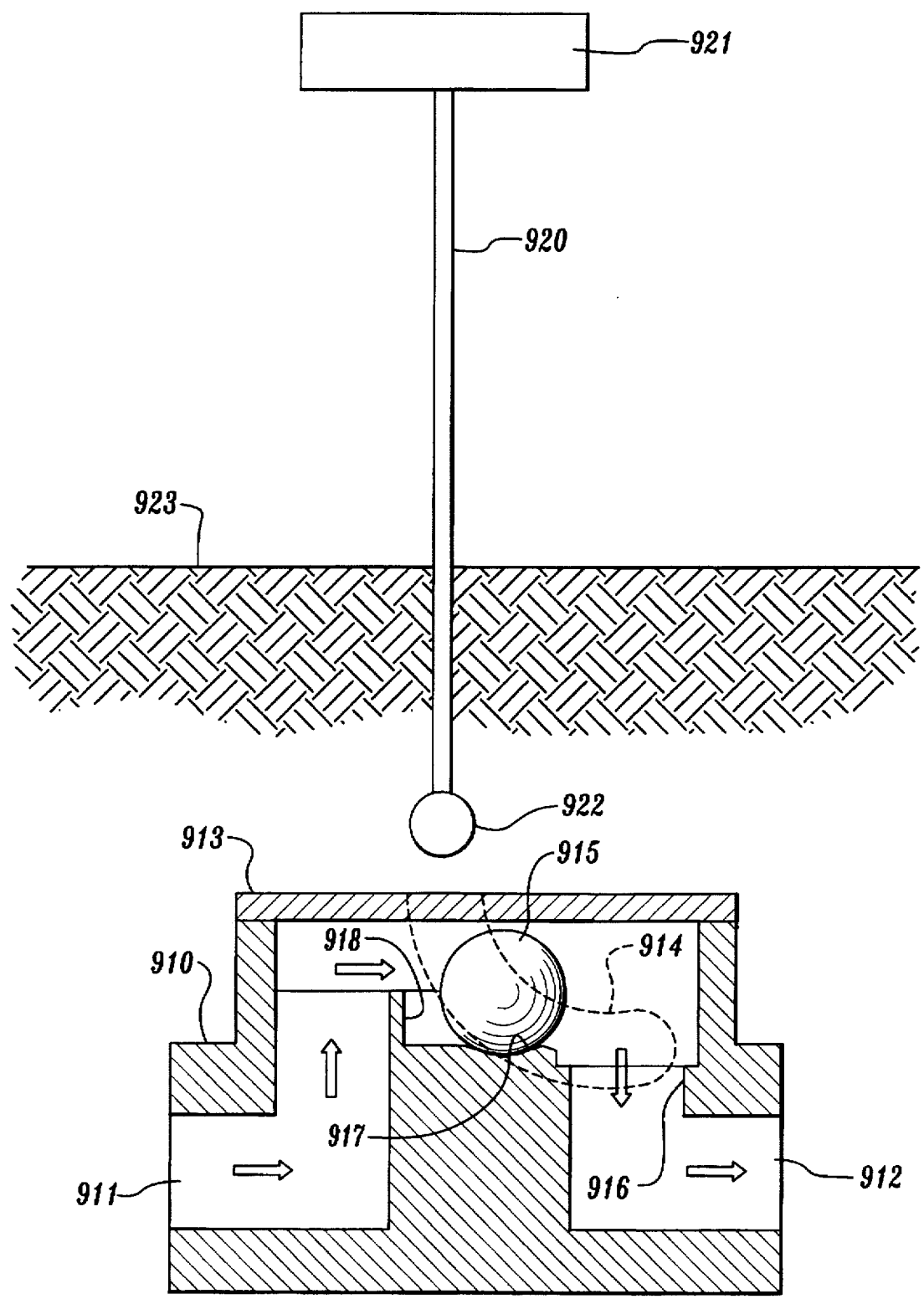

FIG. 34 illustrates the movement of the tool as it is pushed down to engage the magnet 922 with the external groove 914 to a position where the magnet 922 will unseat the inertia ball 915 from the valve seat 916. FIGS. 35 and 36 illustrate the resetting of the valve. The tool is pulled up and out of the external groove 914. As the magnet 922 moves along the external groove 914, the inertia ball 915 follows the magnet 922 to a point where the inertia ball 915 is stopped against the backstop 918. As the magnet 922 is pulled further out of the external groove 914, the inertia ball 915 moves back into the pedestal recess 917, thus resetting the valve to the open position illustrated in FIG. 36.

Figure 37:
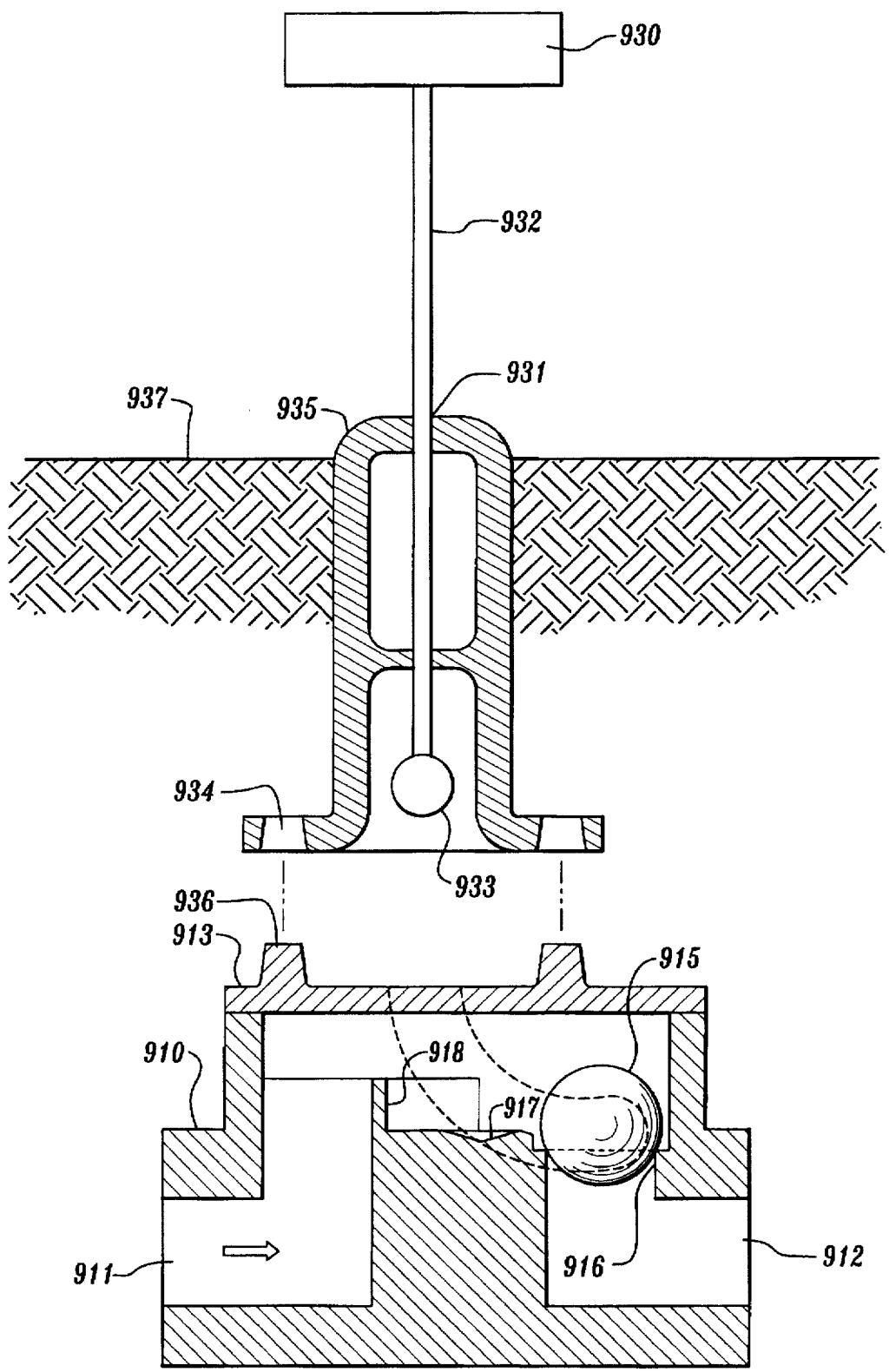
FIGS. 37 and 38 are partly cross-sectional views of a modification of the embodiment according to FIGS. 31–36.
Figure 38:
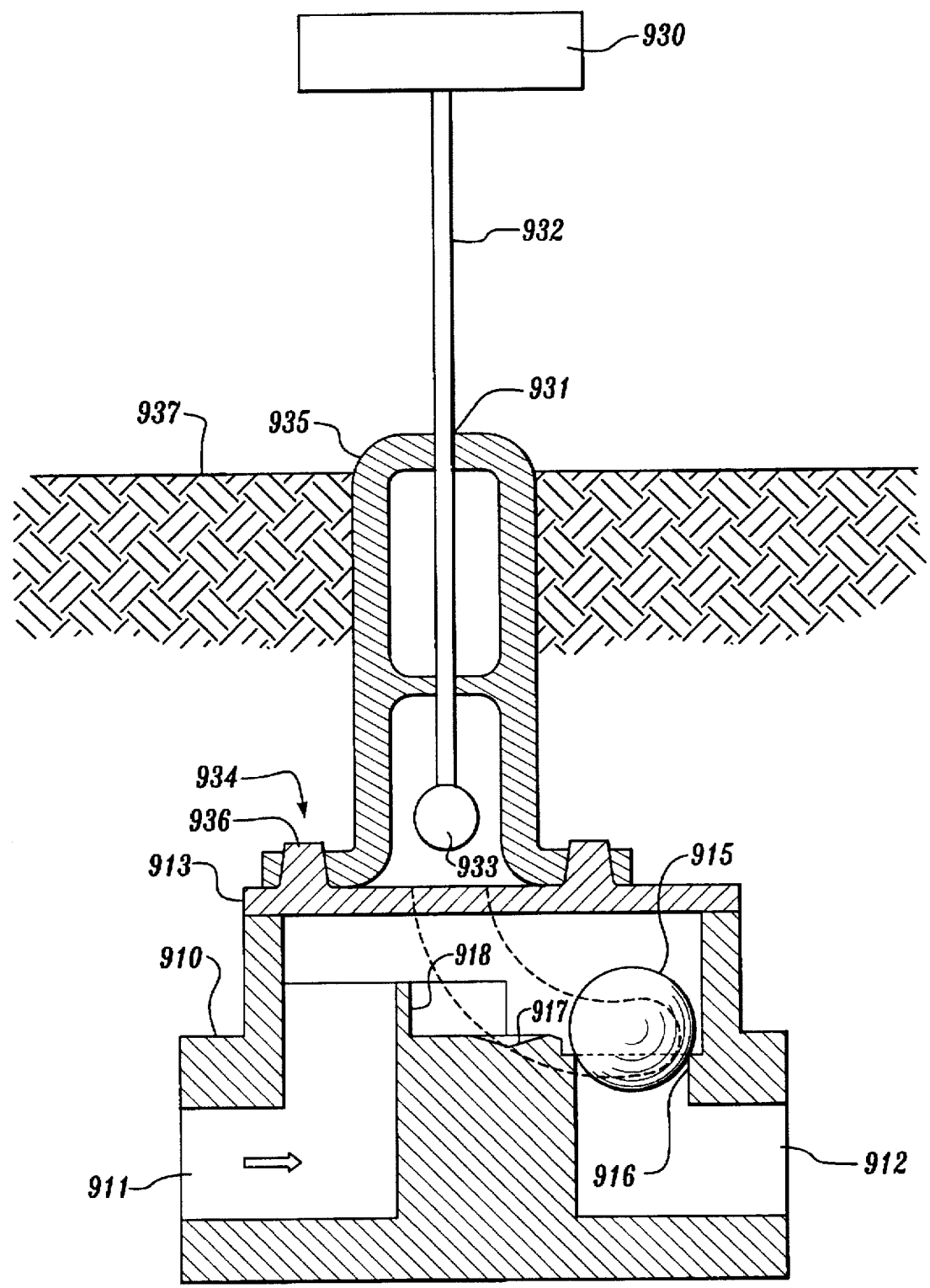

FIGS. 37 and 38 illustrate a modification of the above. In this instance, a tool holder housing 935 is provided in order to position the tool, here designated by reference numerals 930–933, on the valve housing. Specifically, the tool holder housing 935 has locating holes 934 in a lower flange thereof. These holes engage alignment locators 936 provided on the upper surface of the top 913 of the housing 910. The tool holder housing 935 thus provides internal guides for the tool having the handle 930, shaft 932 and magnet 933. The operation of resetting the valve is the same as discussed above.

Figure 39:
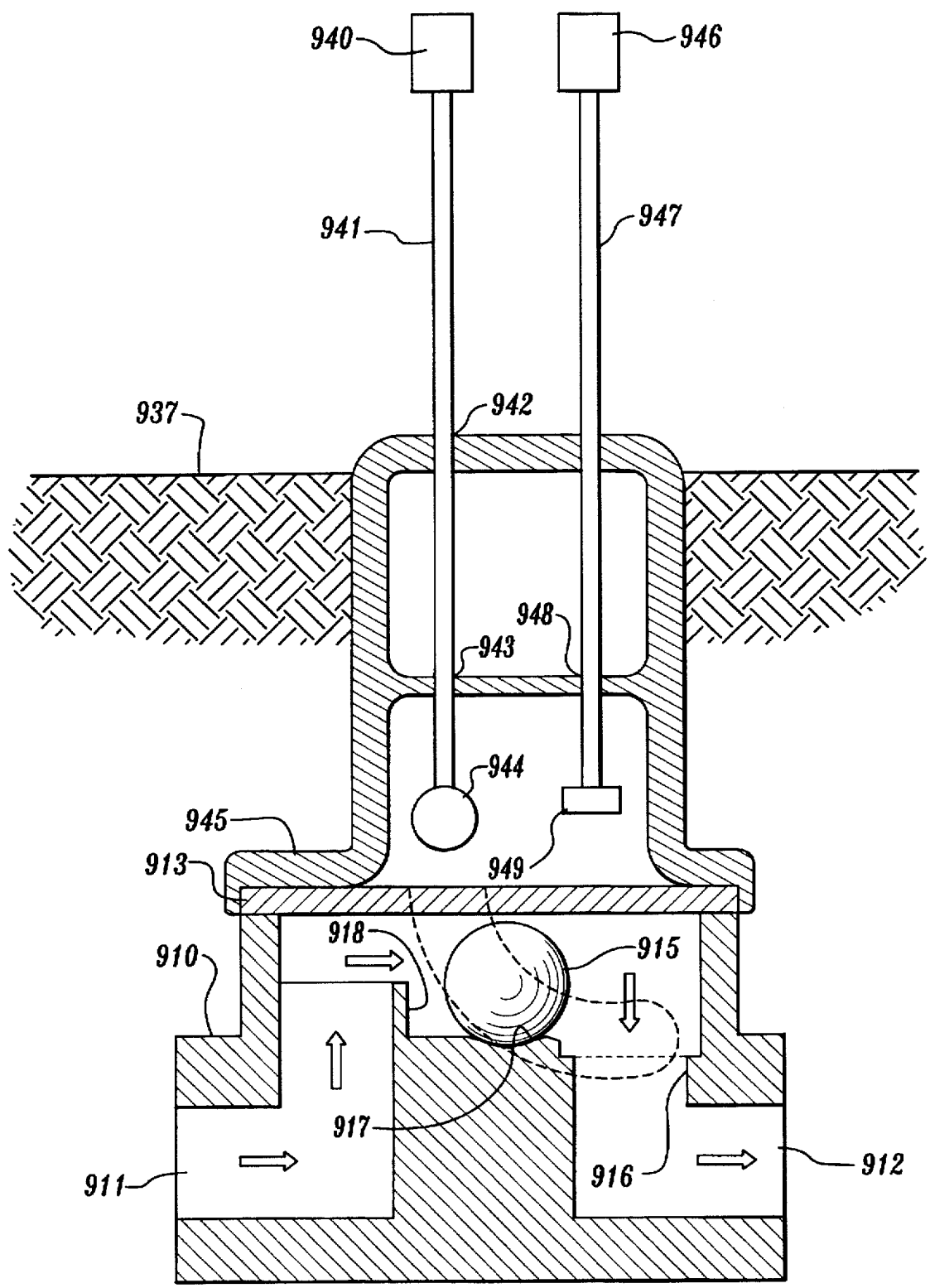
FIGS. 39 and 40 are partly cross-sectional views of a further modification of the safety shutoff apparatus according to the present invention.
Figure 40:
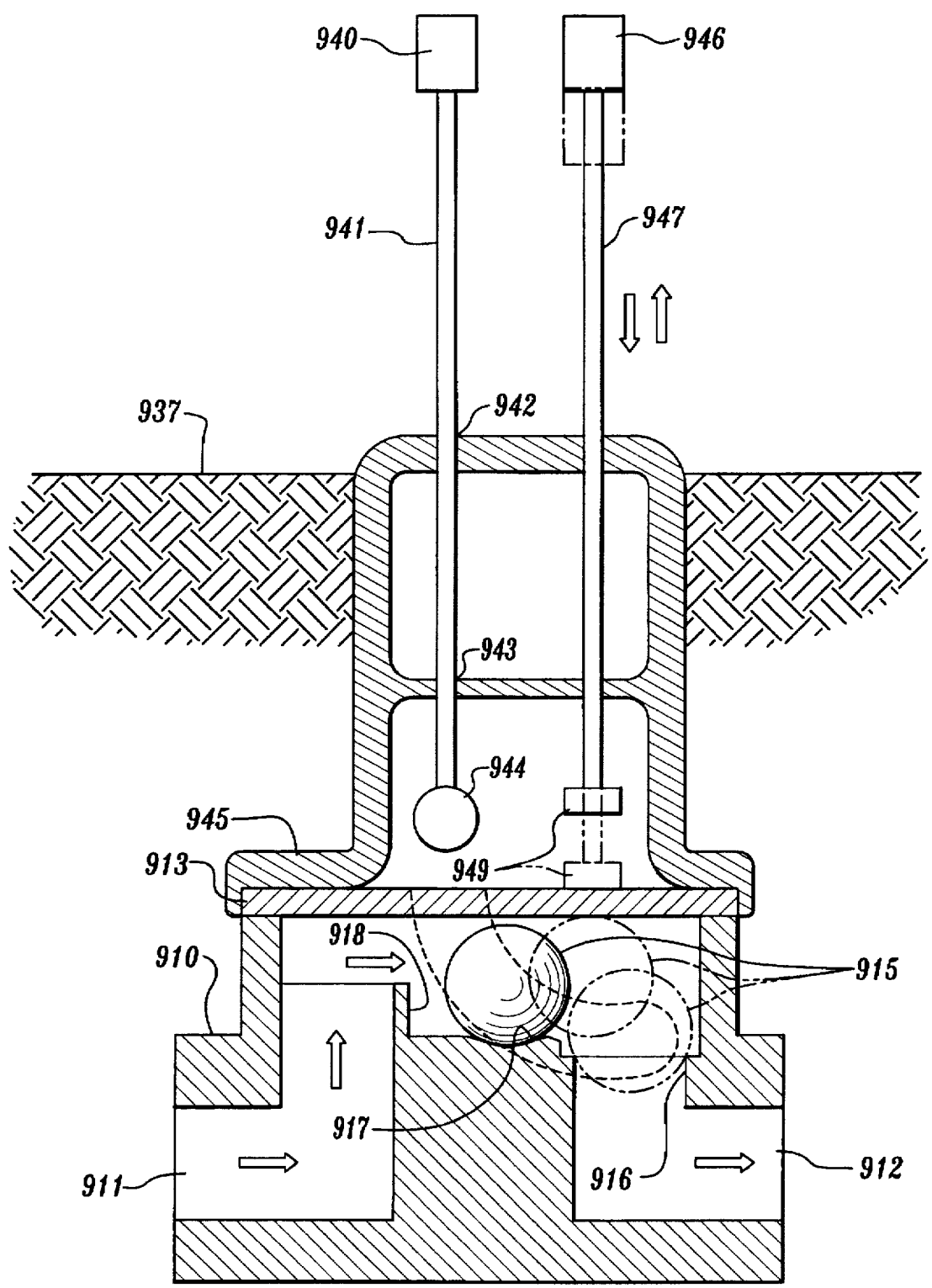

FIGS. 39 and 40 illustrate an additional modification. A tool similar to the one discussed above is provided, including a handle 940, a flexible shaft 941 extending through openings 942 and 943 and a tool housing 945 and a magnet 944 on the end of the flexible shaft 941. However, as can be seen from the figure, an additional tool including a handle 946, a shaft 947 and a magnet 949 is provided. This tool is provided for manually actuating the valve. The operation of this tool is illustrated in FIG. 40.

In manually actuating the valve of FIG. 40, the inertia ball 915 is positioned in the pedestal recess 917, and the handle 946 is moved downward as indicated by the arrows to a point where the magnet 949 is positioned such that the inertia ball 915 is within the magnetic field of the magnet 949. The magnet 949 then pulls the inertia ball 915 off of the pedestal recess 917 and attracts the inertia ball to the position illustrated, against the top 913 of the housing 910 in FIG. 40. By then again moving the handle 946 upwardly, the magnetic field of the magnet 949 moves away from the inertia ball 915, and the inertia ball 915 is released. However, because the inertia ball 915 is no longer over the recess 917, the inertia ball 915 will fall onto the valve seat 916 and activate (close) the valve.

While the present invention has been described with reference to the foregoing embodiments, it will be understood by those skilled in the art that various changes and modifications may be made thereto which fall within the scope of the appended claims.

We claim:

1. A seismic safety apparatus, comprising:

a housing having an internal space and an external surface;

a seismic safety activating mechanism inside said housing, said seismic safety activating mechanism comprising:

an inertia ball recess located in said internal space of said housing, an inertial ball located inside said housing having an unactuated position on said inertia ball recess and an actuated position in which said inertia ball is displaced inside said housing from said unactuated position on said recess, said unactuated position being located generally above said actuated position, wherein said inertia ball recess is formed such that when said inertia ball is in said inertia ball recess, vibrations or seismic shocks of a predetermined magnitude can cause said inertia ball to move from said unactuated position to said actuated position due to the inertia of said inertial ball, and an engagement component inside said housing at said actuated position for engagement with said inertia ball when said inertia ball is displaced from said unactuated position; and means for moving said inertia ball between said actuated position and said unactuated position, said means including an attractive element for movement across said external surface between a first position at least about as high as said unactuated position of said inertia ball and a second position at least about as low as said actuated position of said inertia ball, and said means further including a groove on said external surface of said housing having said attractive element disposed therein, said groove extending between a first position corresponding to said actuated position and a second position corresponding to said unactuated position, and an operator mounted on said external surface of said housing for moving said attractive element in said groove.

2. The apparatus of claim 1, wherein said attractive element comprises a manually movable permanent magnet exterior of said housing.

3. The apparatus of claim 1, wherein said engagement component of said seismic safety activating mechanism is a valve seat in said housing located between a fluid inlet in said housing and a fluid outlet in said housing.

4. The apparatus of claim 2, wherein said magnet is connected to one end of a vertically movable rod, the other end of said rod having a handle thereon, and said magnet is positioned above said external surface of said housing at a position laterally displaced relative to said inertia ball recess.

5. A seismic safety apparatus, comprising:

a housing having an internal space, an external surface, a fluid inlet, a fluid outlet and a fluid path between said fluid inlet and said fluid outlet;

a seismic safety activating mechanism inside said housing, said seismic safety activating mechanism comprising an inertia ball recess located in said internal space of said housing, an inertia ball located inside said housing having an unactuated position on said inertia ball recess and an actuated position in which said inertia ball is displaced inside said housing from said unactuated position on said recess, wherein said inertia ball recess is formed such that when said inertia ball is in said valve member recess, vibrations or seismic shocks of a predetermined magnitude can cause said inertia ball to move from said unactuated position to said actuated position, and an engagement component inside said housing at said actuated position for engagement with said inertia ball when said inertia ball is displaced from said unactuated position, said engagement component comprising a valve seat located in said fluid path such that when said inertia ball is in said actuated position, said inertia ball blocks said fluid path; and a permanent magnet external to said housing and connected to one end of a vertically movable flexible rod, said magnet being movable between a first position adjacent to said actuated position and exterior of said housing to a second position adjacent to said unactuated position and exterior of said housing.

6. The apparatus of claim 5, wherein said housing has a groove therein on the exterior thereof extending between said first and second positions.

* * * * *